US011766762B1

(12) United States Patent
Miller

(10) Patent No.: US 11,766,762 B1
(45) Date of Patent: Sep. 26, 2023

(54) ADJUSTABLE VISE SYSTEM

(71) Applicant: Elijah Tooling, Inc., Denton, TX (US)

(72) Inventor: Richard V. Miller, Denton, TX (US)

(73) Assignee: Elijah Tooling, Inc., Denton, TX (US)

( * ) Notice: Subject to any disclaimer, the term of this patent is extended or adjusted under 35 U.S.C. 154(b) by 812 days.

(21) Appl. No.: 16/747,079

(22) Filed: Jan. 20, 2020

Related U.S. Application Data

(63) Continuation-in-part of application No. 15/883,991, filed on Jan. 30, 2018, now Pat. No. 10,695,877.

(60) Provisional application No. 62/452,164, filed on Jan. 30, 2017.

(51) Int. Cl.

| | |
|---|---|
| ***B23Q 1/42*** | (2006.01) |
| ***B23Q 1/28*** | (2006.01) |
| ***B23Q 3/06*** | (2006.01) |
| ***B25B 1/02*** | (2006.01) |

(52) U.S. Cl.
CPC .................................... *B25B 1/02* (2013.01)

(58) Field of Classification Search
CPC ............... B25B 1/02; B23D 51/04; B23Q 3/06
USPC .................................... 269/86, 87, 87.1, 87.2
See application file for complete search history.

(56) References Cited

U.S. PATENT DOCUMENTS

| | | | | |
|---|---|---|---|---|
| 2,195,277 | A * | 3/1940 | Kleinman | B25B 1/2463 269/304 |
| 2,429,801 | A * | 10/1947 | Butler | B25B 1/2463 100/295 |
| 3,510,922 | A | 5/1970 | Dzus et al. | |
| 4,186,916 | A * | 2/1980 | Varga | B23Q 3/066 269/303 |
| 4,191,367 | A * | 3/1980 | Speiser et al. | B25B 1/02 384/42 |
| 4,616,967 | A | 10/1986 | Molina | |
| 4,772,000 | A * | 9/1988 | Aubert | B25B 5/06 269/254 CS |
| 6,095,736 | A | 8/2000 | Miller et al. | |
| 6,296,431 | B1 | 10/2001 | Miller | |
| 8,087,861 | B2 | 1/2012 | Wang | |
| 8,770,902 | B1 | 7/2014 | Miller | |
| 8,939,691 | B2 | 1/2015 | Tseng | |
| 9,272,378 | B1* | 3/2016 | Miller | B23Q 3/066 |
| 2008/0084017 | A1* | 4/2008 | Barziza | B23Q 3/103 269/100 |
| 2009/0202319 | A1 | 8/2009 | Wang et al. | |
| 2010/0107377 | A1* | 5/2010 | Li et al. | B25B 5/10 24/457 |
| 2011/0045915 | A1 | 2/2011 | Wang | |
| 2011/0070049 | A1 | 3/2011 | Wang | |
| 2012/0224935 | A1 | 9/2012 | Chiu | |

OTHER PUBLICATIONS

Office Action dated Feb. 3, 2020 from corresponding U.S. Appl. No. 15/883,991.

* cited by examiner

*Primary Examiner* — Tyrone V Hall JR
*Assistant Examiner* — Dana Lee Poon
(74) *Attorney, Agent, or Firm* — James E. Walton

(57) ABSTRACT

A workholding system includes an adjustable vise, a fixed vise, and a fixture plate. The adjustable vise and the fixed vise are secured to the fixture plate using a T-slot and a fastener. The system includes multiple precision locating surfaces, including interchangeable precision locating surfaces, to secure a working part. In one embodiment, a T-slot fastener facilitates the creation of an entire workholding system that facilitates the rapid installation of studs into receiving members. The fastener includes a quarter turn fastener used in workholding applications to quickly hold and release components of the system, such as tooling, parts, and plates. The compact design of the system makes possible the ability to insert the quarter turn fastener into a device that can fit into a T-slot and still have considerable holding power. The system is lower in cost than other solutions.

23 Claims, 31 Drawing Sheets

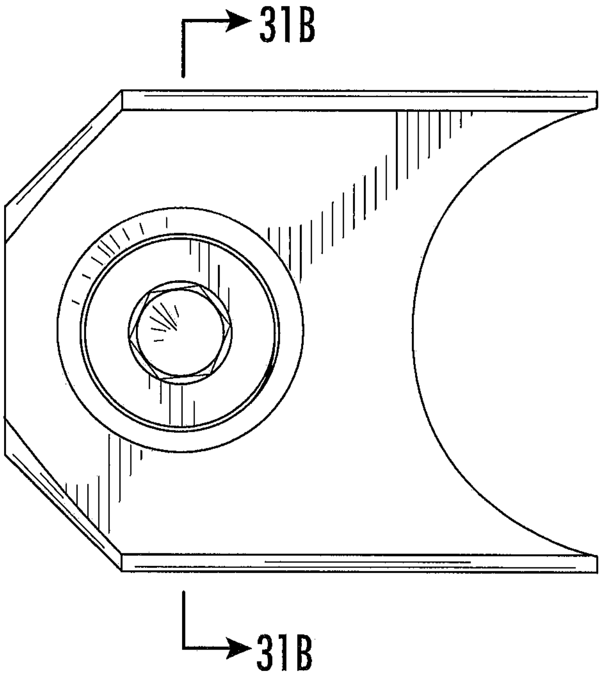
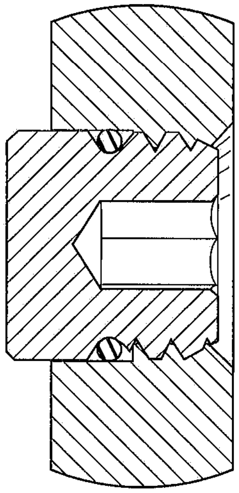
FIG. 31B
FIG. 31A
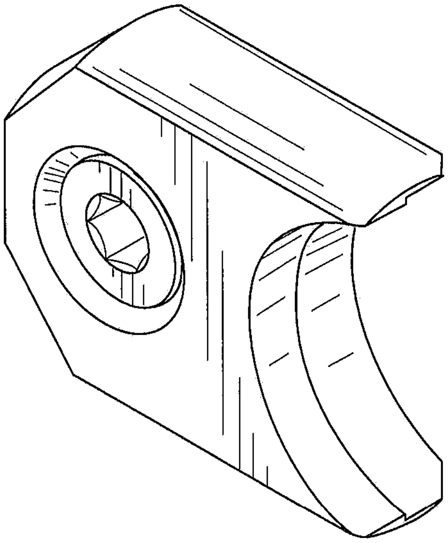
FIG. 31C
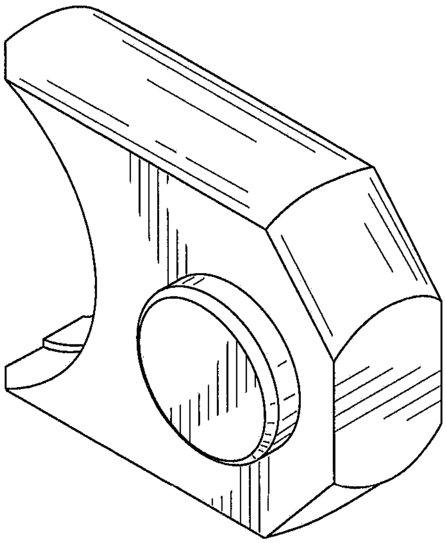
FIG. 31D

ADJUSTABLE VISE SYSTEM

CROSS REFERENCE TO RELATED APPLICATIONS

This application is a continuation-in-part of U.S. Pat. Application Serial No. 15/883,991, filed 30 Jan. 2018, titled "Workholding System Using Quarter Turn Device", by Richard V. Miller, which claims the benefit of U.S. Provisional Application No. 62/452,164, filed 30 Jan. 2017, titled "Workholding System Using Quarter Turn Device", all of which are hereby incorporated by reference for all purposes as if fully set forth herein.

BACKGROUND

1. Field of the Invention

The present application relates to milling machines that incorporate T-Slot baseplate fixtures.

2. Description of the Related Art

The present application relies on subject matter disclosed in U.S. Pat. Application Serial No. 15/883,991, filed 30 Jan. 2018, titled "Workholding System Using Quarter Turn Device", by Richard V. Miller, which is incorporated by reference in its entirety for all purposes.

Most milling machines incorporate a T-slot baseplate fixture. This fixture is considered "sacrosanct" and is rarely used for anything but attaching vises by way of bolts and T-slot nuts. If it is used, it locates and holds another fixture, often called a sub-plate fixture.

Although there have been great advances in the area of T-slot baseplate fixtures for milling machines, considerable shortcomings remain.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the following accompanying drawings.

FIGS. 12A-18D depict a fastener used to releasably fasten a first object and a second object.

FIG. 12A depicts the housing in the top view where holes in the face are used to screw/ drive the housing into the first object. Although the drive holes are the preferred embodiment, there are other options available for installing the housing.

FIG. 18D Depicts the assembled fastener in trimetric view.

FIGS. 19A-24D Depict a different embodiment of the fastening device (referred to as a T-Slot fastener) described by FIGS. 12A-18D, with a housing definition that does not include outer threads. This device is specifically used such that the first object is a T-slot wherever they may be incorporated. This device and devices with similar outside housings form the basis of the work-holding system that later described by this application.

FIG. 19A Depicts the housing in top view. The preferred embodiment incorporates a circular outside diameter, but there are other shapes that may be used.

FIG. 24D Depicts the assembled fastener in trimetric view.

FIGS. 25A-28D Depict a novel locating device (T-slot locator) that consists of a modified FIGS. 24A-24D housing in which the internal features are now adapted to accept retractable dowel pins. The preferred embodiment of the housing incorporate flats to remove the O-ring, but may also exclude them. The retractable dowel pin in the base can be raised and lowered, such that it can be in use, or not. When lowered the retractable dowel pin engages and locates with the counter-bore in the T-slot fixture. Due to the close concentricity in the housing this location is then made available to the top retractable dowel pin, which in turn locates the second object. When lowering the base retractable dowel pin the housing is biased against the T-slot fixture, holding the T-slot fastener in place.

FIGS. 25A, 25B, 25C Depict the retractable dowel pin which consists of a locating shoulder; drive feature (shown as a hex but may include other features) on either end, or both; threads; and O-ring. The retractable dowel pin, when screwed into a multi-purpose hole (defined as a bored plus threaded hole) provides exact location to a secondary object.

FIG. 28D Depicts the assembled T-slot locator in trimetric view.

FIGS. 29A-31D Depict a novel locating device (T-slot locator slider) that consists of a biasing member and a retractable dowel pin. The preferred embodiment of the biasing member will fit the width of the accepting T-slot and supply a radii that matches the outer diameter of the T-slot fastener. The purpose of this device is to precisely locate the T-slot fastener by engaging the locating counter-bored holes in the base of the T-slot. Like the T-slot locator, this devise incorporates a precise counter-bore and thread combination to facilitate the use of a retractable dowel pin. When lowering the retractable dowel pin, the biasing member is moved against the T-slot fixture, holding the T-Slot locator firmly in place. This is not the only embodiment which can serve this purpose. For example, there could be two radii locating surfaces that would facilitate locating two T-slot fasteners at the same time.

FIG. 29A Depicts the biasing member in the top view.

FIG. 31A Depicts the assembled T-slot locator slider in top view.

FIG. 31B Depicts the assembled T-slot locator slider in section view.

FIG. 31C Depicts the assembled T-slot locator slider in section view.

FIG. 31D Depicts the assembled T-slot locator slider in trimetric view.

Figure 1A:
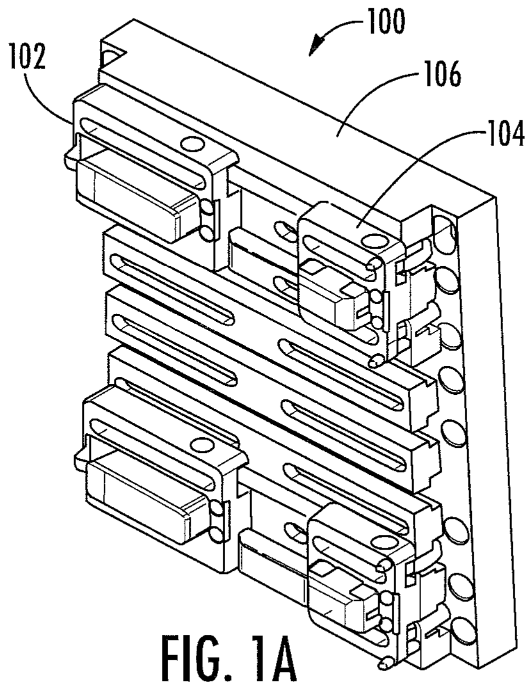
FIG. 1A is a perspective view of an improved adjustable vise system in accordance with a preferred embodiment of the present application.
Figure 1B:
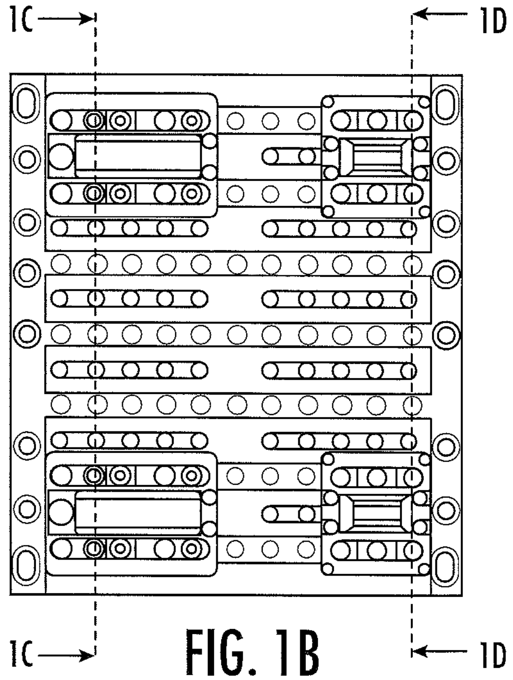
FIG. 1B is a top view of an adjustable vise system in accordance with a preferred embodiment of the present application.
Figure 1C:
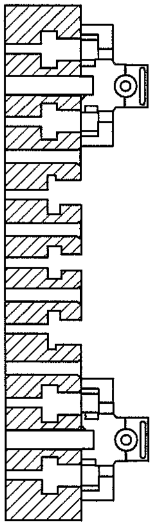
FIG. 1C is a section view of an adjustable vise system taken along line C in accordance with a preferred embodiment of the present application.
Figure 1D:
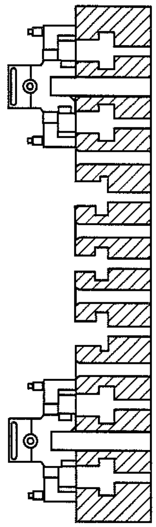
FIG. 1D is a section view of an adjustable vise system taken along line D in accordance with a preferred embodiment of the present application.
Figure 1E:
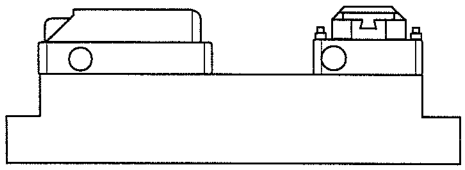
FIG. 1E is a side view of an adjustable vise system in accordance with a preferred embodiment of the present application.
Figure 2A:
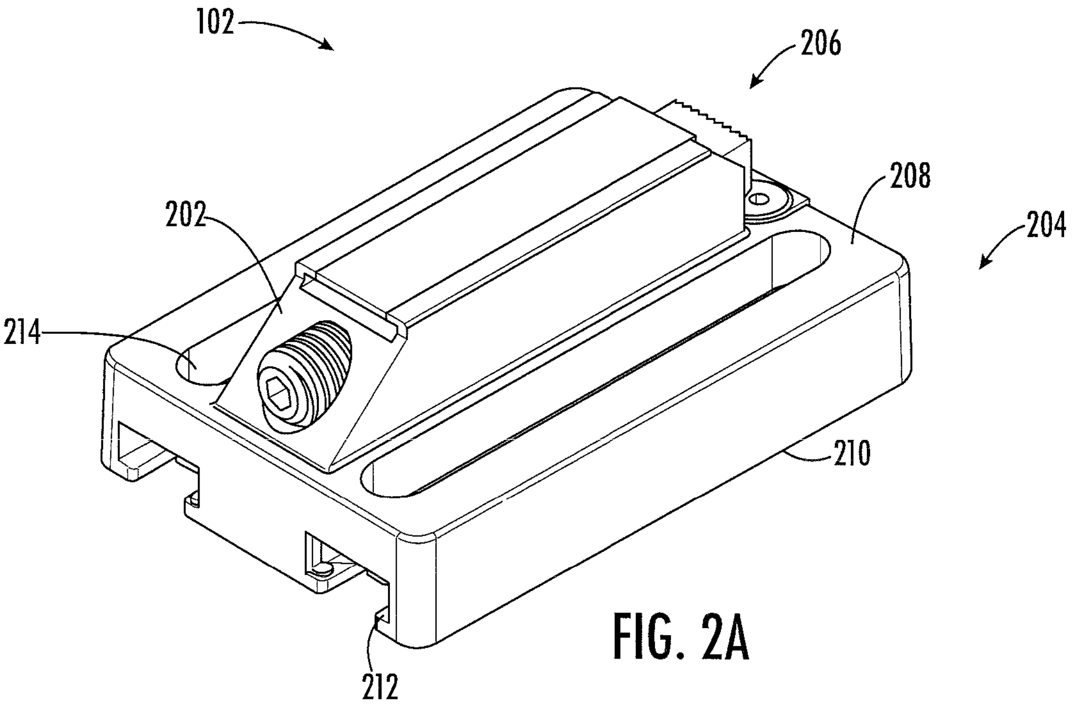
FIG. 2A is a perspective view of an adjustable vise member in accordance with a preferred embodiment of the present application.
Figure 2D:
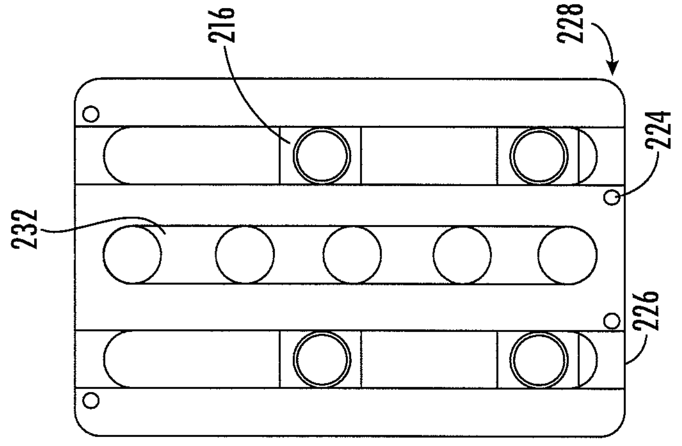
FIG. 2D is a bottom view of an adjustable vise member in accordance with a preferred embodiment of the present application.
Figure 2C:
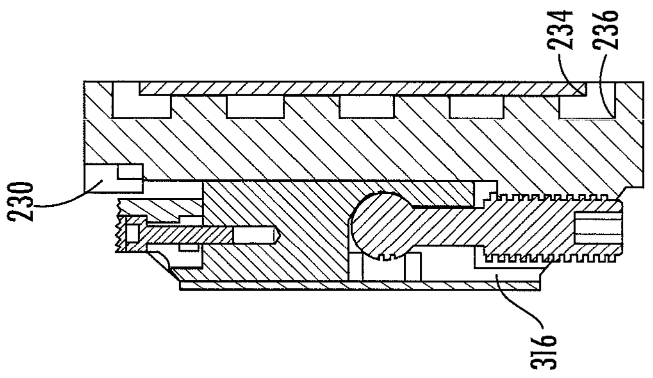
FIG. 2C is a section view of an adjustable vise member taken along line C in accordance with a preferred embodiment of the present application.
Figure 2B:
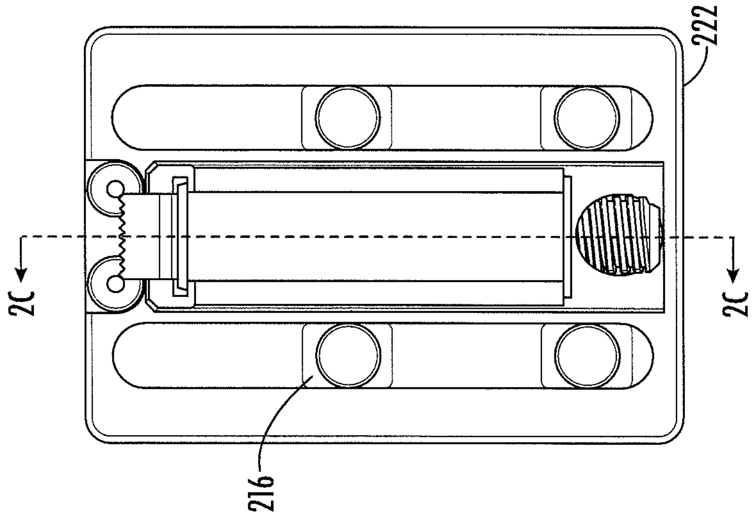
FIG. 2B is a top view of an adjustable vise member in accordance with a preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined herein.

DETAILED DESCRIPTION

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The terms "precision location" and "precision locating" are used herein. Precision location combines the concepts of accuracy and precision to indicate a situation in which something is reliably located repeatedly. These terms refer to the ability to locate something accurately, in such a way that features that are to be made based upon that location can be depended upon to be in that location over and over again (repeatedly). Accuracy refers to the positional tolerance when compared to theoretical exact positions. The closer the positional tolerance is to theoretical exact positions, the more accurately the piece is located. The more frequently a piece is placed in that position of accuracy indicates its preciseness. The tooling products disclosed herein are used to accurately and precisely change pieces, tools, plates, objects rapidly and repeatedly. This precision location is necessitated by the tolerances required for modern products. It is noted that although tooling and machining are discussed throughout the present application, the vise members, fixture plate, fasteners, and other aspects are applicable to any number of systems and uses involving linear forces, such as in woodworking, metalworking, vacuum vises, plumbing, diemaking, tool sharpening, jewelry, tying flies, blacksmith vise, rigging, and combinations thereof.

The present application facilitates the use of baseplate T-slots directly by making a way to hold and locate other objects internal to the slot. This virtually eliminates the need for a sub-plate and also makes it possible to quickly change vises directly on the T-slot baseplate. In addition, by virtue of the unique characteristics of these locating/holding products, a sub-plate fixture that incorporates T-slots (described herewith) can fulfill the specifications of a highly precise, quick-change modular fixture at lower cost than conventional methods.

The versatility of the vise members enables legacy attachment using conventional screws or other fasteners. The low profile, robust design of the vise members provides the ability to machine parts having dimensions as low as one-half inch and lower. The increased number of attachment options and use of in-line force allows machining parts of any dimension, including continuous lengths and widths, which may require the use of risers and interchanging, replacing, and/or cycling base plates and vise members from the machined end to the advancing end of the machineable part. The attachment options also enable vise members to be separated from each other by any distance, using risers, spacers, or stops to prevent twisting, flexing, warping, or other deformations that can occur in machineable parts having significant lengths.

The novel quarter turn fasteners and various embodiments (like the T-slot fastener) described herein are used in workholding applications to create the means to quickly hold, release, and adjust objects (like tooling, parts, and plates). In a preferred embodiment, the T-slot fastener, facilitates the creation of an entire workholding system that is novel and lower in cost than other solutions.

The workholding system further includes multiple precision locating surfaces. The multiple precision locating surfaces include, but are not limited to, sliding precision locating surfaces, pin precision locating surfaces, fastener precision locating surfaces, flange precision locating surfaces, threaded precision locating surfaces, channel precision locating surfaces, serrated precision locating surfaces, smooth precision locating surfaces, reversible precision locating surfaces, and interchangeable precision locating surfaces. The multiple precision locating surfaces are used individually or in combination to support, stop, or hold a machinable part with high precision during machining.

The quarter turn fastener design facilitates the rapid installation of the stud into the receiving member. The compact design also makes possible the ability to insert it into a device that can fit into a T-slot and still have considerable holding power.

The fastener device is self-contained and includes a unitary housing that is releasably fastened to the receiving member. A release inset is pressed into the housing at the lower end of the housing. The fastener device also includes a threaded stud that is located within the housing. The stud includes an enlarged section which mates with the housing stop shoulder and serves to retain the stud within the housing when the fastener is in a fully engaged position. The stud is adapted to fit the release inset, which when turned one-quarter turn will bias out of the housing. The release inset, or a second release inset, may be pressed into the housing at an upper end of the housing to secure a receiving member from a top surface.

This design can be incorporated into a device that uniquely works in a T-slot that when combined with specific characteristics of location and position, can perform the duties of a universal, flexible, modular fixture.

Preferably, T-slot locators are formed as channels to provide a sliding adjustment to the workholding system along at least one axis, such as the y-axis. After components of the system are slid into place, fasteners, such as threaded, quarter turn, retractable dowel pins, and/or T-fasteners, are used to secure the component and prevent further sliding movement along the respective axis. Vise members and base plates include additional elongated channels to provide additional sliding adjustment and/or attachment.

Referring now to FIGS. 1A-1E, views of an improved adjustable vise system 100 for holding a part for machining are illustrated. In a preferred embodiment, the adjustable vise system 100 includes adjustable vise member 102, fixed vise member 104, and fixture plate 106. Adjustable vise member 102 and fixed vise member are removably connected and precisely located on fixture plate 106. In other embodiments, the adjustable vise member 102 and/or the fixed vise member 104 are used with a conventional base plate (not shown) and/or a modular base plate, such as a base plate without T-slots and elongated slots that includes openings for threaded screws, bolts, and/or other conventional fasteners.

In a preferred embodiment, adjustable vise member 102 is adjusted to secure a machineable part between it and the fixed vise member. The adjustment occurs using a rotationally attached, keyed drive screw. The machineable part is secured between the vise members to prevent movement along three axes during machining of the part.

Referring now also to FIGS. 2A-2D, adjustable vise member 102 includes first housing 202 having a lower base 204 and an upper pusher guide 206 formed thereon. For example, in a preferred embodiment, housing 202 is a unitary member, with the lower base 204 and the upper pusher guide 206 formed together as a single member. In another embodiment, the upper pusher guide is formed separate from the lower base and is attached to the lower base during vise assembly.

In a preferred embodiment, lower base 204 has an upper surface 208 and a lower surface 210. T-slot 212 is formed in the lower surface 210, and elongated slot 214 is formed in the upper surface 208 of the lower base 210. The elongated slot 214 is formed of a dimension to house T-slot nut 216. The dimensions of T-slot nut 216 correspond to elongated slot 214, or visa verse. For example, a depth 218 of the T-slot may correspond to a height of T-slot nut 216. In a preferred embodiment, channel 214 is open-ended, and provides access to a fastener therein from the top surface of the adjustable vise member. In another embodiment, channel 214 is a through channel, providing access from both the bottom and the top surfaces of the adjustable vise.

In some embodiments, a ratio of the height of lower base 204 to a height at which the gripper of the pusher assembly applies force to the machineable part ranges from about 1:4 to about 1:2. Preferably, the ratio of the height of the lower base 204, as measured from surface 208 to surface 210, to the height of the center of gripper 306 (see FIG. 3B below), as measured from surface 210 to center of gripper 306, is about 1:3. The ratio of the total adjustable vise member height to total length ranges from about 1:3 to about 1:2. Preferably the ratio of total adjustable vise member height to total length is about 2:5.

In a preferred embodiment, T-slot 212 is open-ended. This means that the T-slot is open to provide access to T-slot nut 216 from at least one side 222 of the adjustable vise member. In another embodiment, the T-slot is open to provide access to T-slot nut 216 from both sides of the adjustable vise. T-slot nut 216 is slidingly housed within the T-slot. Preferably, a first set screw 224 is adjustably set at edge 226 of end 228 of the T-slot to prevent T-slot nut 216 from unintentionally sliding out of the slot.

In a preferred embodiment, in order to tighten a fastener to secure T-slot nut 216, the fastener and/or the T-slot nut 216 are accessed from the top side of fixture plate 106. In another embodiment, fastener and/or the T-slot nut 216 are accessed from the underside of fixture plate 106.

In a preferred embodiment, the adjustable vise member 102 further includes an interchangeable wear pad 230 connected to housing 202. For example, housing 202 includes threaded openings for receiving fasteners, and wear pad 230 is attached to the housing by inserting the fasteners into the openings and corresponding openings in the wear pad.

In a preferred embodiment, the adjustable vise member 102 further includes elongated slot 232 formed in/on lower surface 210. The elongated slot 232 has a first depth 234 that extends the length of the slot to form a channel, and a second depth 236 corresponding to dowel pin openings formed in the slot. Both the channel and the dowel pin openings are of a dimension that corresponds to a dimension of a retractable dowel pin. For example, the width of the channel corresponds to a width of a square dowel pin or a diameter of a round retractable dowel pin. When the dowel pin is inserted at the first depth 234, the lower base slides along the dowel pin using the channel formed in the elongated slot 232. At the second depth 236, the retractable dowel pin secures the base against any movement along at least two axes (e.g., x- and y-axes). In a preferred embodiment, the dowel pin openings in slot 232 are smooth. In another embodiment, the dowel pin openings are threaded. When the dowel pin openings are threaded and the dowel pin is rotationally inserted therein, the base is secured against movement along all three axes. It is noted that although only two depths 234 and 236 are depicted, additional depths may be formed in the adjustable vise member 102 for additional purposes. For example, in the middle opening a third depth (not shown) may be formed to provide a pivot point to the adjustable vise member 102. For instance, the adjustable vise may be secured to a base plate for machining along a first axis in a first machining step. In a second machining step, the vise member 102 may need to maintain its exact location on the base plate but may need to be rotated to provide machining along a second axis. A tool may be inserted in the opening having the third depth to enable maintaining the adjustable vise member 102 at the exact location while pivoting the vise member 102 to provide machining along the second axis.

Figure 3A:
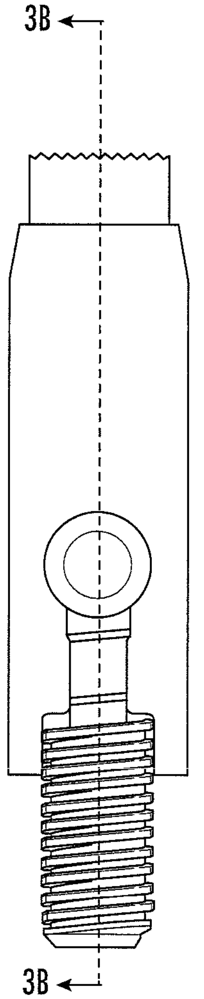
FIG. 3A is a top plan view of a pusher assembly in accordance with a preferred embodiment of the present application.
Figure 3B:
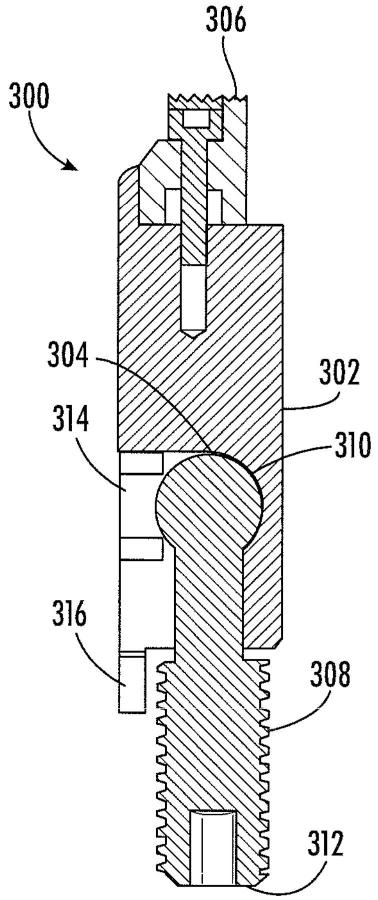
FIG. 3B is a section view of a pusher assembly taken along line B in accordance with a preferred embodiment of the present application.

Referring now also to FIGS. 3A and 3B, the adjustable vise member 102 includes pusher assembly 300. Pusher assembly 300 includes pusher block 302 having rounded seat 304. Pusher block 302 is connected to gripper 306 by way of a fastener, such as a threaded screw, bolt, rivets, or combinations thereof. In a preferred embodiment, gripper 306 is removable. Pusher assembly 300 further includes keyed drive screw 308 having ball end 310 (wiper) and keyed end 312. Ball end 310 sits within rounded seat 304, abutting the pusher block such that when rotational force is received at keyed end 312 the drive screw advances gripper 306. In a preferred embodiment, the keyed end 312 is a hex key end, but other ends such as a 4-point, 5-point, or 10-point key end are encompassed by the present application.

In a preferred embodiment, gripper 306 has a serrated, interchangeable precision locating surface. In another embodiment, gripper 306 is replaceable with a second gripper that has a smooth, grooved, or dovetailed precision locating surface.

In a preferred embodiment, pusher assembly 300 further includes capture washer 314 seated on top of ball end 310, and side plate 316 slidingly connected to the adjustable vise housing at or in proximity to the keyed end 312. The sliding connection of side plate 316 is enabled by seating side plate 316 within a channel of the adjustable vise housing, restricting movement of the pusher assembly along two axes (z-axis and x-axis) while enabling movement along one axis (y-axis). Capture washer 314 prevents slag, or unwanted movement, at the ball end 310 of the drive screw 308 and side plate 316 prevents slag at the keyed end 312.

In a preferred embodiment, capture washer 314 has a smooth precision locating surface corresponding to a smooth surface at the ball end of the drive screw. In another embodiment, capture washer 314 has one or more grooves to sit within a corresponding grooved portion of the ball end of the drive screw, thereby providing additional security against unwanted movement. A cover plate secures capture washer in place above the drive screw to further prevent unwanted movement.

Figure 4A:
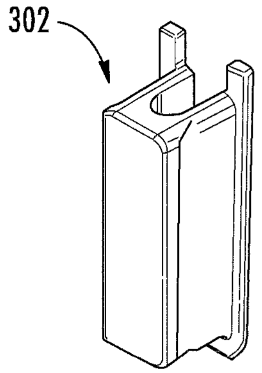
FIG. 4A is a perspective view of a pusher block in accordance with a preferred embodiment of the present application.
Figure 4B:
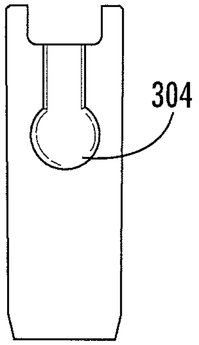
FIG. 4B is a top plan view of the pusher block of FIG. 4A in accordance with a preferred embodiment of the present application.

Referring now also to FIGS. 4A and 4B, pusher block 302 is illustrated. In a preferred embodiment, rounded seat 304 of the pusher block is smooth. In an alternative embodiment, the rounded seat may include one or more grooves that mesh with corresponding grooves in the ball end of the drive screw to provide additional security against unwanted movement. In a preferred embodiment, a side of the pusher block 302 has a beveled edge that connects with a slightly protruding straight edge. The point of connection between the beveled edge and the protruding straight edge creates a channel. The channel of the pusher block 302 seats a corresponding protruding portion of housing 202 (not shown) to enable secure sliding of the pusher block within housing 202 when the keyed end 312 receives a rotational force.

Figure 5:
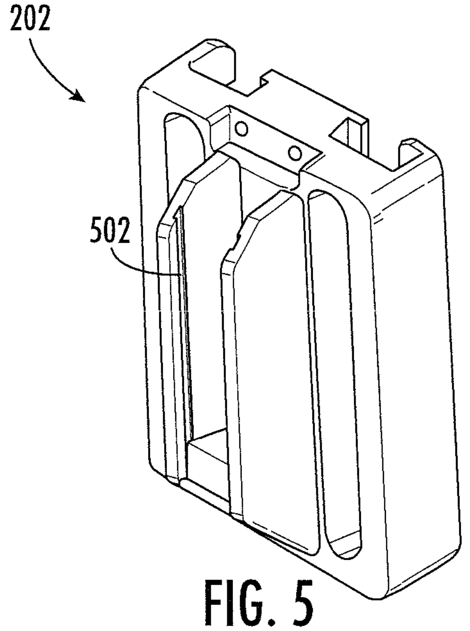
FIG. 5 is a perspective view of a housing of an adjustable vise member in accordance with a preferred embodiment of the present application.

Referring now also to FIG. 5, housing 202 is illustrated. In a preferred embodiment, housing 202 is a unitary housing. In another embodiment, the housing has two or more separate, component parts, such as the lower base 204 and the upper pusher guide 206, that require assembly using fasteners or welding. In a preferred embodiment, housing 202 includes a channel 502 to house a portion of side plate 316 and prevent unwanted movement of the pusher assembly.

Figure 6A:
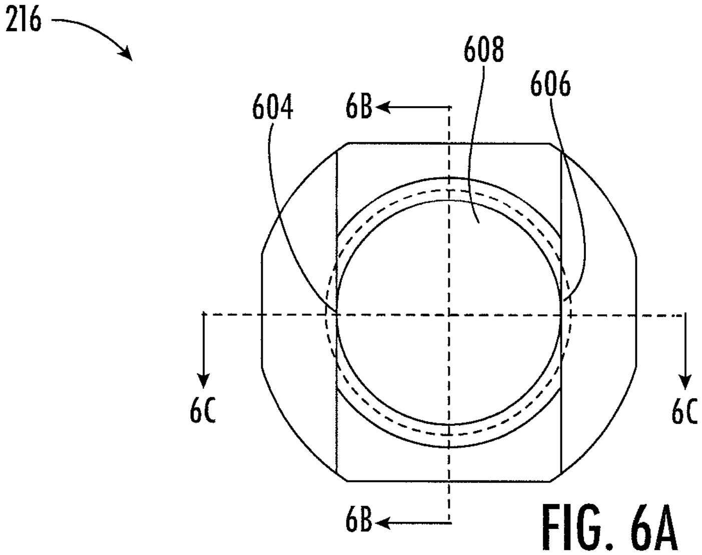
FIG. 6A is a top plan view of a T-nut fastener in accordance with a preferred embodiment of the present application.
Figure 6B:
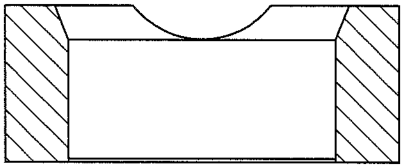
FIG. 6B is a section view of a T-nut fastener taken along line B in accordance with a preferred embodiment of the present application.
Figure 6C:
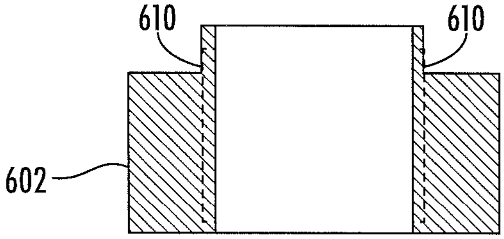
FIG. 6C is a section view of a T-nut fastener taken along line C in accordance with a preferred embodiment of the present application.

Referring now also to FIGS. 6A-6C, T-slot nut 216 is illustrated. T-slot nut 216 includes a flanged housing 602. Flanged housing 602 includes a first overlapping flange 604 and a second overlapping flange 606 that are adapted to mate with a quarter-turn fastener. The stud of the quarter-turn fastener is advanced into a receiving member opening 608 of the T-slot nut 216. Upon receiving a rotational force, the stud of the quarter-turn fastener is rotated a quarter turn, allowing corresponding flanges on the stud to simultaneously abut and secure the first overlapping flange 604 and the second overlapping flange 606. In a preferred embodiment, T-slot nut 216 is configured to mate with the quarter-turn fastener. In another embodiment, the T-slot nut 216 is threaded along portion 610 and configured to mate with a zip-bushing, threaded dowel pin, or another threaded fastener.

Figure 7:
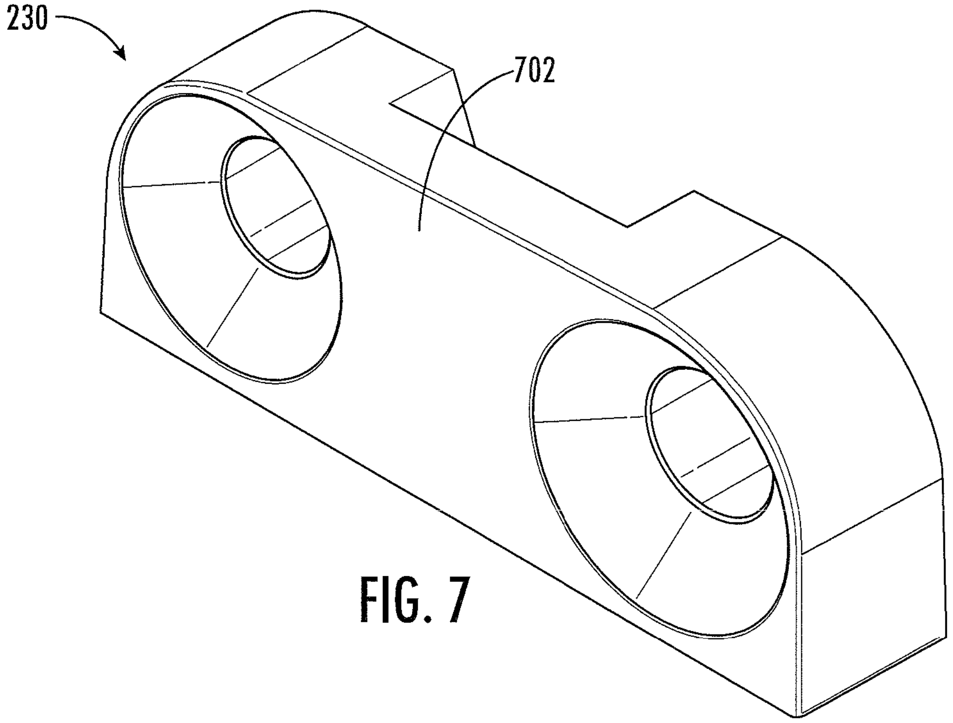
FIG. 7 is a perspective view of a wear pad in accordance with a preferred embodiment of the present application.
Figure 8A:
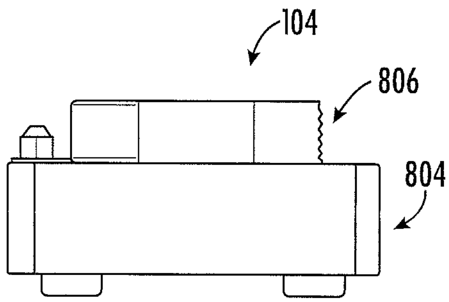
FIG. 8A is a side view of a fixed vise member in accordance with a preferred embodiment of the present application.
Figure 8B:
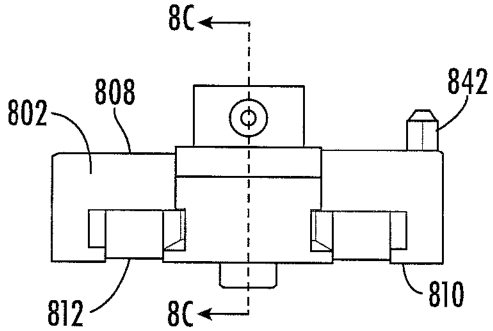
FIG. 8B is a front view of a fixed vise member in accordance with a preferred embodiment of the present application.
Figure 8C:
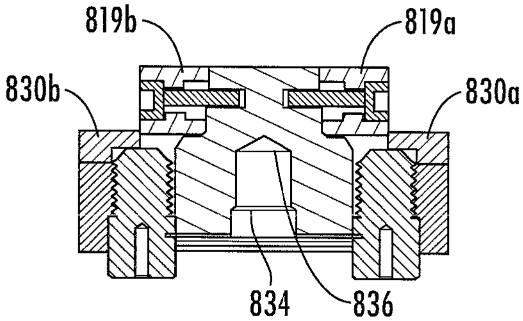
FIG. 8C is a cross-section of the fixed vise member taken along line C in accordance with a preferred embodiment of the present application.
Figure 8D:
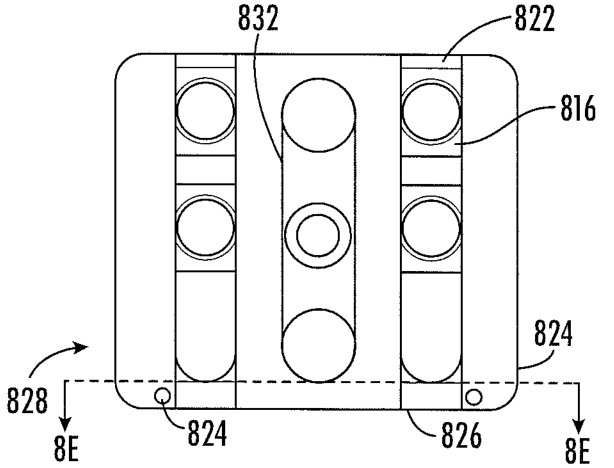
FIG. 8D is a bottom view of a fixed vise member in accordance with a preferred embodiment of the present application.
Figure 8E:
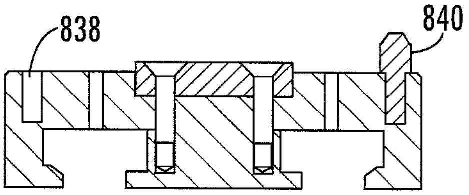
FIG. 8E is a cross-section of the fixed vise member taken along line E in accordance with a preferred embodiment of the present application.

Referring now also to FIG. 7, wear pad 230 is illustrated. Wear pad 230 includes an interchangeable precision locating surface 702. In a preferred embodiment, precision locating surface 702 is smooth or straight-lined. In another embodiment, a second wear pad having a grooved, serrated, or a dovetail precision locating surface is exchanged with wear pad 230. It is noted that despite excessive use, the adjustable vise system maintains precision location through the exchange of used, worn precision location surfaces with new precision location surfaces, such as a new wear pad.

Referring now also to FIGS. 8A-8E, fixed vise member 104 is illustrated. Fixed vise member 104 includes housing 802 having lower base 804 and upper abutment block 806. In a preferred embodiment, housing 802 is a unitary housing. In another embodiment, the housing has two or more separate, component parts that require assembly using fasteners or welding.

In a preferred embodiment, lower base 804 has an upper surface 808 and a lower surface 810. T-slot 812 is formed in the lower surface 810, and elongated slot 814 (see FIG. 9) is formed in the upper surface 808 of the lower base 810. In a preferred embodiment, the T-slot 812 is formed of a dimension to house T-slot nut 816. Preferably, the dimensions of T-slot nut 816 correspond to T-slot 812. In another embodiment, the dimensions of T-slot 812 correspond to T-slot nut 816. For example, a width 818 of the T-slot may correspond to a width of T-slot nut 816.

In some embodiments, a ratio of the height of lower base 804 to a height at which the gripper 819 of the upper abutment block receives force ranges from about 1:4 to about 5:6. Preferably, the ratio of the height of the lower base 804, as measured from surface 808 to surface 810, to the height of the center of the gripper, as measured from surface 810 to the center of the gripper, is about 3:4. The ratio of the total fixed vise member height to total length ranges from about 1:3 to about 1:2. Preferably the ratio of total fixed vise member height to total length is about 1:2.

In a preferred embodiment, elongated slot 814 provides tightening or loosening access to a fastener attached to T-slot nut 816, while retaining T-slot nut 816 within T-slot 812. Thus, a width of the elongated slot 814 is less than a width or a diameter of the T-slot nut 816. The access to the T-slot nut 816 provided by the elongated slot 814 is from a top side of the fixture plate 106 and a top side of the fixed vise. In another embodiment, the fastener attached to T-slot nut 816 is accessed from below, or a bottom side, of the fixture plate 106 and a bottom side of the fixed vise.

In a preferred embodiment, T-slot 812 is open-ended. This means that the T-slot provides access to T-slot nut 816 from at least one side 822 of the fixed vise member. In another embodiment, the T-slot is open to provide access to T-slot nut 816 from both sides of the adjustable vise. T-slot nut 816 is slidingly housed within the T-slot. Preferably, a first set screw 824 is adjustably set at edge 826 of end 828 of the T-slot to prevent T-slot nut 816 from unintentionally sliding out of the slot.

In a preferred embodiment, the fixed vise member 104 further includes an interchangeable wear pad 830 connected to housing 802. For example, housing 802 includes threaded openings for receiving fasteners, and wear pad 830 is attached to the housing by inserting the fasteners into the openings and corresponding openings in the wear pad.

In a preferred embodiment, the fixed vise member 102 further includes elongated slot 832 formed in/on lower surface 810. The elongated slot 832 has a first depth 834 corresponding to a channel formed in the slot, and a second depth 836 corresponding to dowel pin openings formed in the slot. Both the channel and the dowel pin openings are of a dimension that corresponds to a retractable dowel pin. When the dowel pin is inserted at the first depth 834, the lower base slides along the dowel pin using the channel formed in elongated slot 832. At the second depth 836, the retractable dowel pin secures the base against any movement along at least two axes (e.g., x- and y-axes). The dowel pin may include additional features that further prevent movement along the third axis. For example, the dowel pin may include threads, detents, flanges, or other releasable securing means to controllably prevent motion in the z-axis during machining, and to remove the dowel pin after machining is completed.

In a preferred embodiment, housing 802 includes openings for one or more stop pins. For example, housing 802 includes opening 838 for stop pin 840. In a preferred embodiment, stop pin 840 includes an interchangeable precision locating surface 842 that further prevents movement of a machineable part in a direction along an axis during machining of the part.

In at least one embodiment, multiple additional vise members, such as fixed vise member 104, are included together with the adjustable vise system 100 to extend machining dimensions along one or more axes. In the at least one embodiment, multiple fixture plates 106 are also included together with supports that seat within fixture plate openings to prevent bowing, warping, or distorting long machineable parts.

Figure 9:
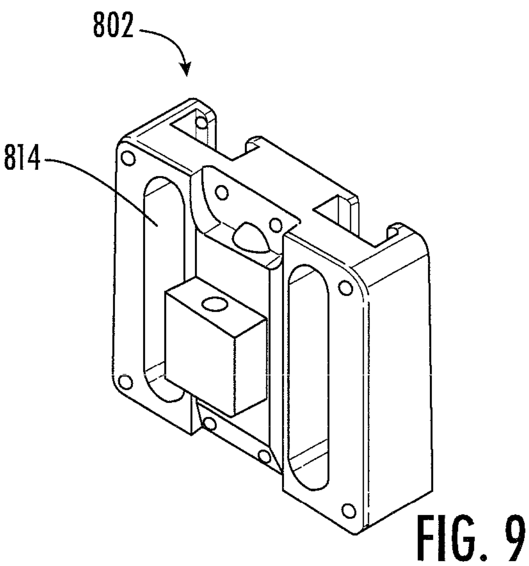
FIG. 9 is a perspective view of a housing of a fixed vise member in accordance with a preferred embodiment of the present application.

Referring now also to FIG. 9, housing 802 is illustrated. In a preferred embodiment, housing 802 is a unitary housing. In another embodiment, the housing has two or more separate, component parts, such as the lower base and the upper abutment block, that require assembly using fasteners or welding.

Referring now also to FIGS. 10A-10E, fixture plate 106 is illustrated. Fixture plate 106 includes housing 1002 having lower base 1004 and upper locating portion 1006. In a preferred embodiment, housing 1002 is a unitary housing. In another embodiment, the housing has two or more separate, component parts, such as the lower base and the upper locating portion, that require assembly using fasteners or welding. In a preferred embodiment, the fixture plate 106 is modular.

Figure 10A:
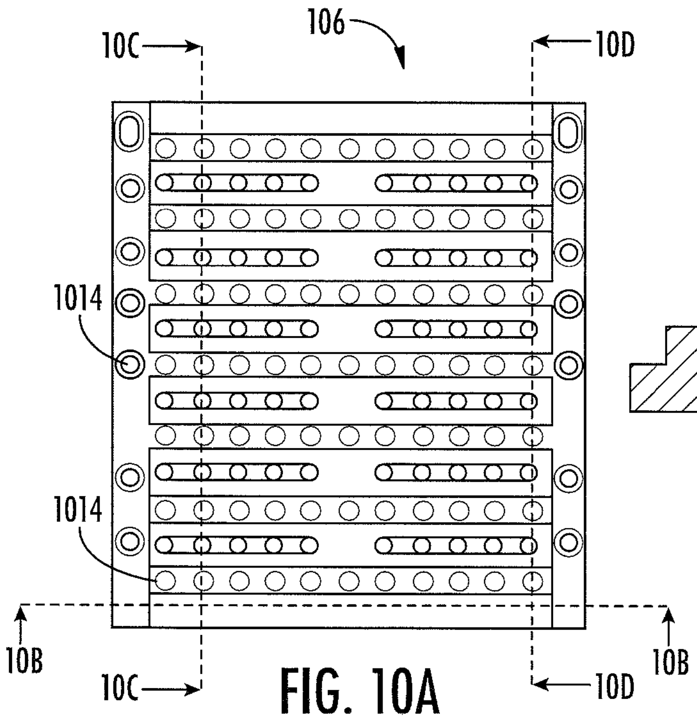
FIG. 10A is a top view of a fixture plate in accordance with a preferred embodiment of the present application.
Figure 10B:
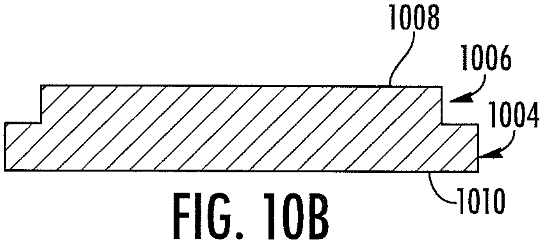
FIG. 10B is a section view of an fixture plate taken along line B in accordance with a preferred embodiment of the present application.
Figure 10C:
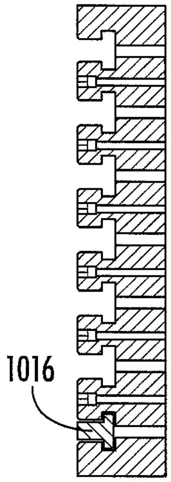
FIG. 10C is a section view of a fixture plate taken along line C in accordance with a preferred embodiment of the present application.

FIG. 10C depicts the modular T-slot fixture plate in section view. Here it can be observed that the slots are at specific distances from each other forming a continuous pattern of slots. In the base of the slot is a bored (precise) circular countersink that is manufactured such that it is precisely related to every other hole in the slot as well as the holes that are adjacent to it in the raised portion of the T-slot. This counter-bore, when used in conjunction with a locator will precisely locate a second object to the first object (see FIGS. 28A-28D below for an illustrative locator).

Figure 10D:
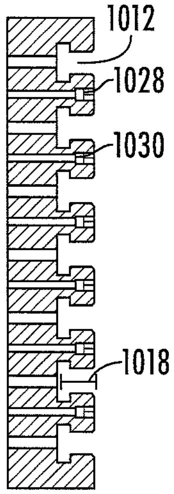
FIG. 10D is a section view of a fixture plate taken along line D in accordance with a preferred embodiment of the present application.

FIG. 10D depicts the modular T-slot fixture plate in section view. Here it can be observed that there are combination holes consisting of a bored (precise diameter) counterbore plus threaded portion below. This hole, referred to as a multi-purpose hole, serve as a means to locate and hold using screws, dowels, retractable dowels, shoulder screws, supports, and other locating/holding objects. The bore plus insert is a preferred embodiment, but can be replaced/substituted with hardened inserts, such as precision threaded locator bushings, bushings, threaded inserts, helicoil inserts and similar.

Figure 10E:
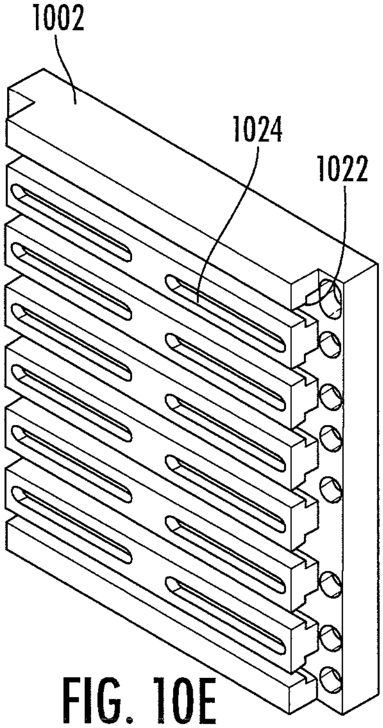
FIG. 10E is a perspective view of a fixture plate in accordance with a preferred embodiment of the present application.

FIG. 10E depicts the modular T-slot fixture plate in trimetric view. Any combination of lower countersunk holes and upper multi-purpose holes can be used, with the consideration that they are all precisely located to each other and specific, precise distances apart, in a grid type pattern. In addition, there is a precise width slot in the top of the T-slot riser that facilitates use of special use, modular vises, that can benefit from the T-slot modular fixture, being held by the T-slot fastener, and located by the retractable dowel pins in the base of the vise, with the precise slot feature.

In a preferred embodiment, lower base 1004 has an upper surface 1008 and a lower surface 1010. T-slot 1012 is formed in the lower base portion having the lower surface 1010, and fixture attachment openings 1014 are formed in the upper surface 1008 of the lower base 1004. The openings 1014 are formed of a dimension to house a zip bushing or a retractable dowel pin stud, such as the stud of pin 1100 (see FIG. 11). The dimensions of T-slot nut 1016 correspond to T-slot 1012, or visa verse. For example, a height 1018 of the T-slot may correspond to a height of T-slot nut 1016.

In a preferred embodiment, a fastener is inserted into T-slot nut 1016 from an underside of fixture plate 106. This means that corresponding openings in the fixture plate are through-holes, extending an entire thickness of the fixture plate (e.g., from top to bottom). In another embodiment, a fastener is inserted into T-slot nut 1016 from the top side of fixture plate 106.

In a preferred embodiment, T-slot 1012 is open-ended. This means that the T-slot provides access to T-slot nut 1016 from at least one side 1022 of the fixture plate. In another embodiment, the T-slot nut 1016 is slidingly housed within the T-slot and it is accessible from two open sides of the fixture plate.

In a preferred embodiment, the fixture plate 106 further includes elongated slot 1024 formed in/on upper locating portion 1006. For example, elongated slot 1024 may be formed in an upper surface of a T-member of the upper locating portion. The elongated slot 1024 has a first depth 1028 corresponding to a channel formed in the slot, and a second depth 1030 corresponding to dowel pin openings formed in the slot. Both the channel and the dowel pin openings are of a dimension that corresponds to a retractable dowel pin, such that when the dowel pin is inserted at the first depth 1028, a vise member slides along the dowel pin using the channel formed in elongated slot 1024. At the second depth 1030, the retractable dowel pin secures the base against any movement along at least two axes (e.g., x- and y-axes).

Figure 11:
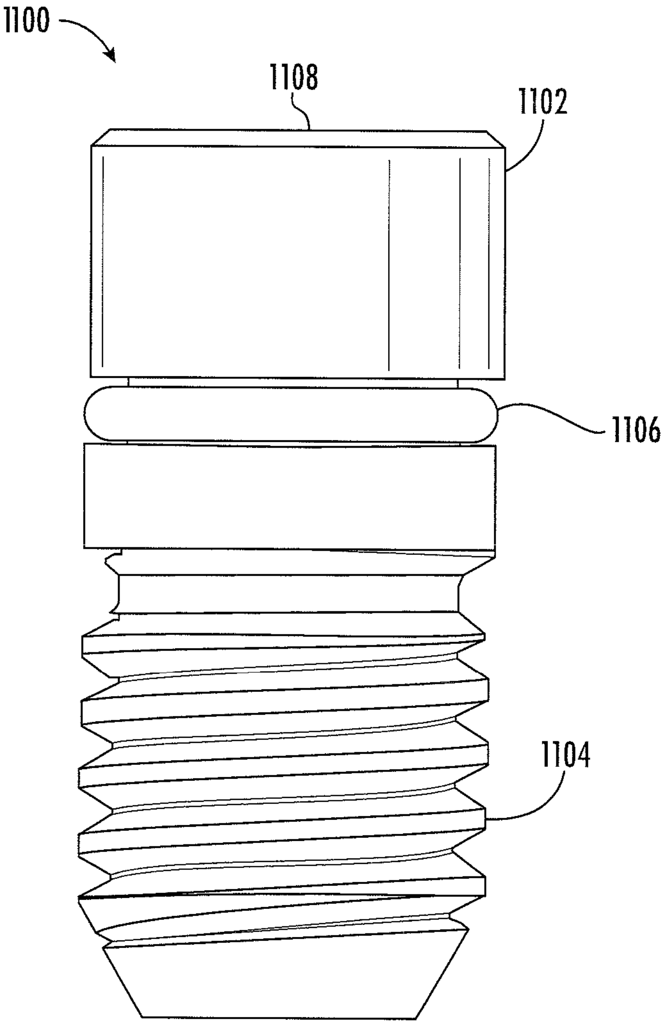
FIG. 11 is a side view of a retractable dowel pin in accordance with a preferred embodiment of the present application.
Figure 12A:
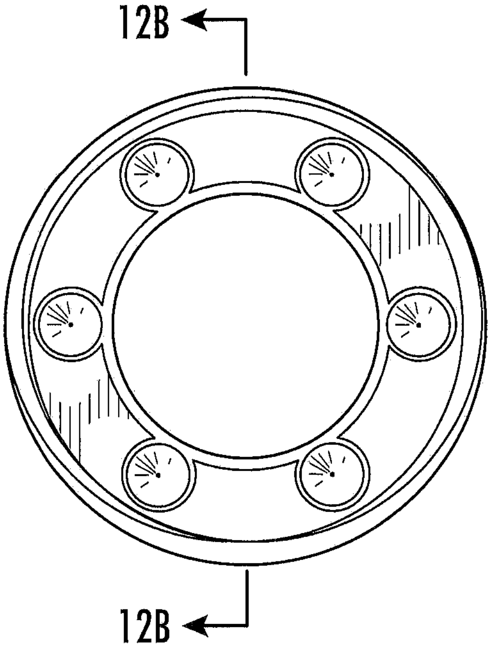
Figure 12B:
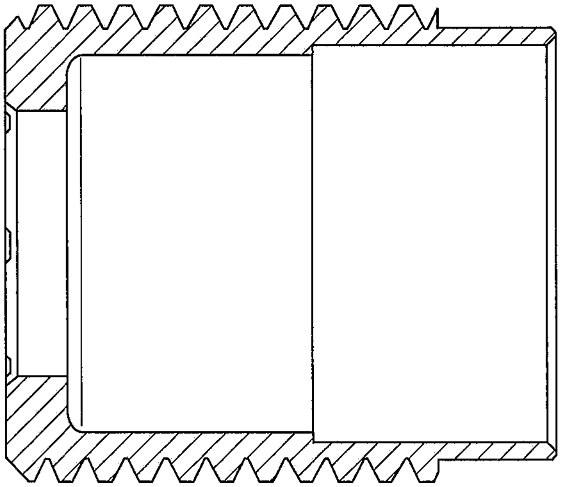
FIG. 12B depicts the housing as a section view where its outer threads can be seen, its inner compartment to house the stud, spring, and release insert. Also shown is the shoulder that captures the stud and prevents it from exiting the housing when engaged.
Figure 12C:
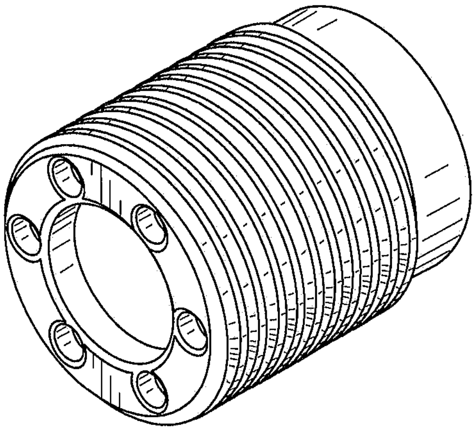
FIG. 12C depicts the housing in trimetric view.
Figure 13A:
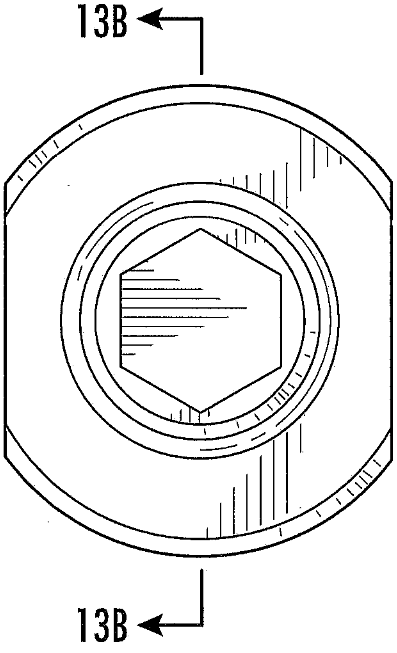
FIG. 13A Depicts the stud in top view. Although the hex shown is a preferred embodiment, there are other methods available to drive it. Also, the hex can be incorporated in one end, both ends, or the other end.
Figure 13B:
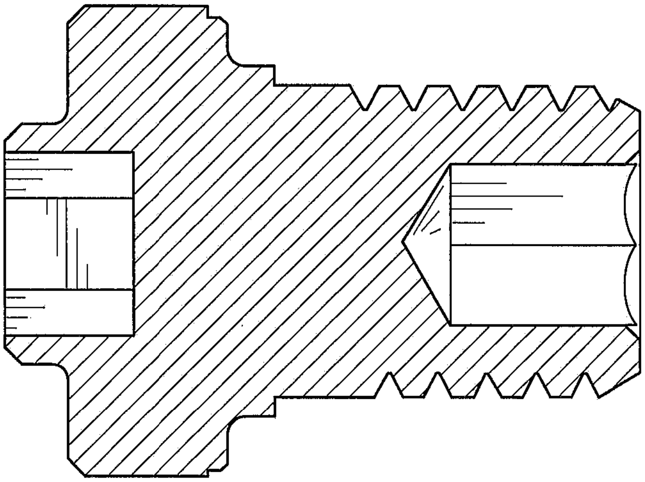
FIG. 13B Depicts the stud in section view which shows the tangs that engage/ dis-engage the release insert as well as the shoulder which is stopped by the housing shoulder. The threads are used to fasten the second object. Although the threads are the preferred embodiment, there are other methods by which the stud can engage/hold the second object.
Figure 13C:
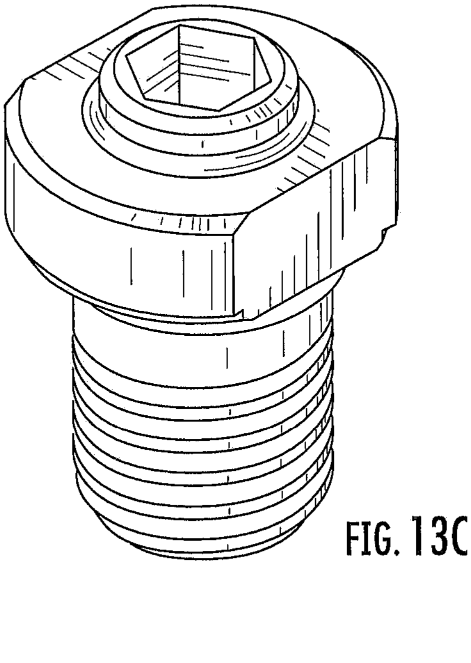
FIG. 13C Depicts the stud in trimetric view.
Figure 14A:
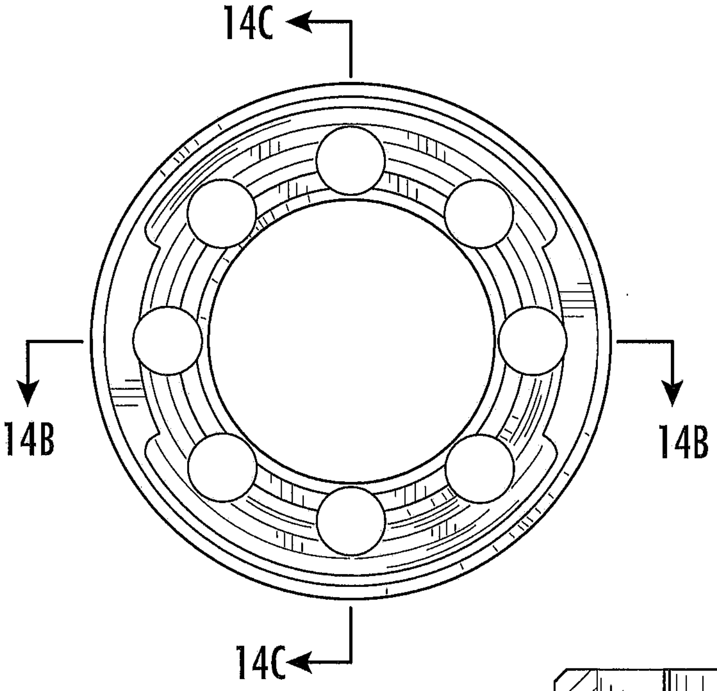
FIG. 14A Depicts the release inset in top view. In this view the tangs that engage the stud and also release the stud, based upon the stud's position, can be seen. Also, the holes in the base of the release inset can be seen. These holes facilitate the flow of liquids/debris through the fastener.
Figure 14B:
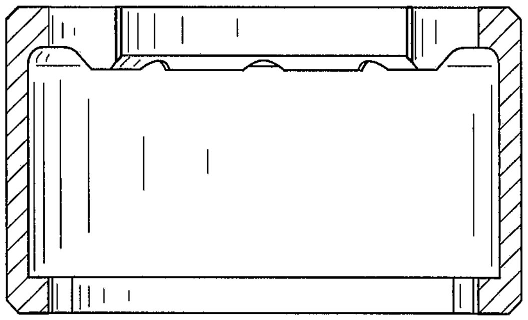
FIG. 14B Depicts the release inset in section view. Here it can be observed that there is a raised area that captures the spring. Although preferred, this raised area is not necessary to the functioning of the device.
Figure 14C:
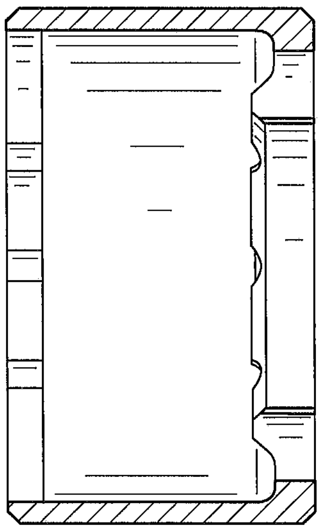
FIG. 14C Depicts the release inset in trimetric view. The walls and floor of the release inset are shown as thin in this depiction, but they can be any width that facilitates the function of the fastener.
Figure 14D:
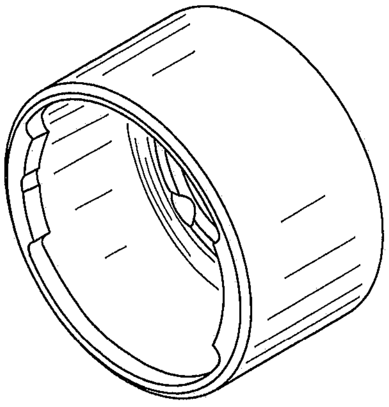
FIG. 14D Depicts the release inset in trimetric view.
Figure 15A:
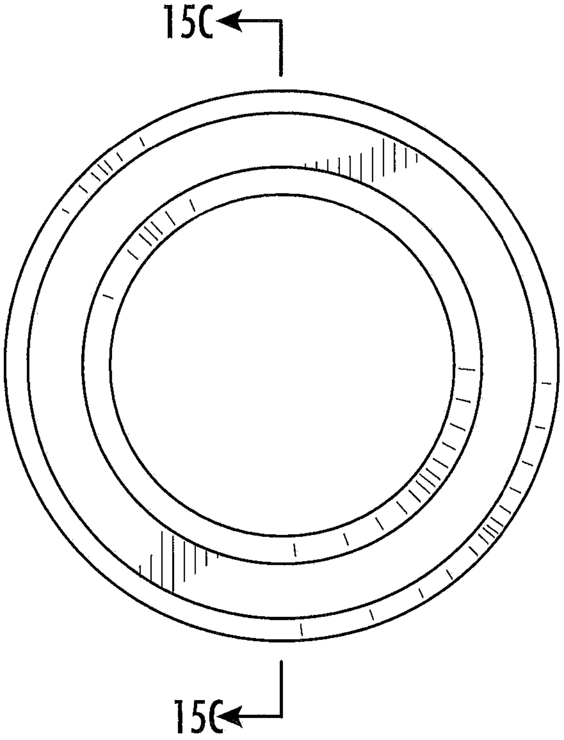
FIG. 15A Depicts the wiper in top view. The wiper is a metal/plastic device that works to prevent debris entering into the fastener. The inner diameter of the wiper almost touches the threads of the stud acting as a device that wipes the studs. The outer diameter of the wiper fits the inner diameter of the housing. The wiper in held in place by the capture inset. The use of the wiper is a preferred embodiment, but unnecessary to the function of fastening the first object to the second object.
Figure 15B:
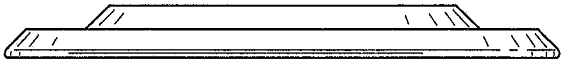
FIG. 15B Depicts the wiper in side view.
Figure 15C:
FIG. 15C Depicts the wiper in section view where the metal and plastic components can be seen.
Figure 16A:
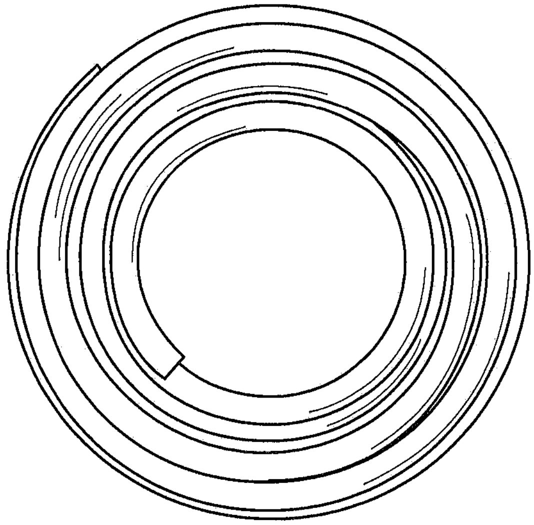
FIG. 16A Depicts the spring in top view. This spring is the preferred embodiment since it compresses to an almost flat condition, and is used to bias the stud up and out of the housing. Other spring configurations can also be used, depending upon the configuration of the release inset, housing and stud.
Figure 16B:
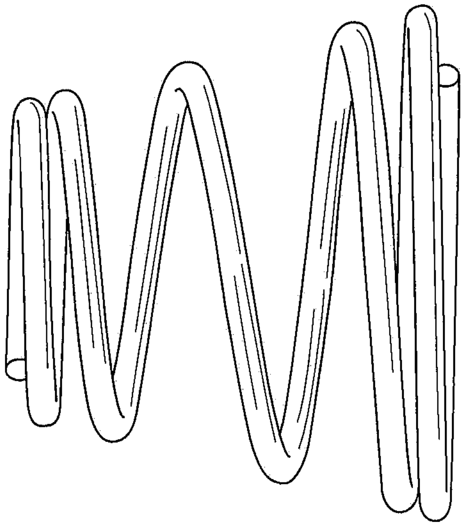
FIG. 16B Depicts the spring in side view.
Figure 16C:
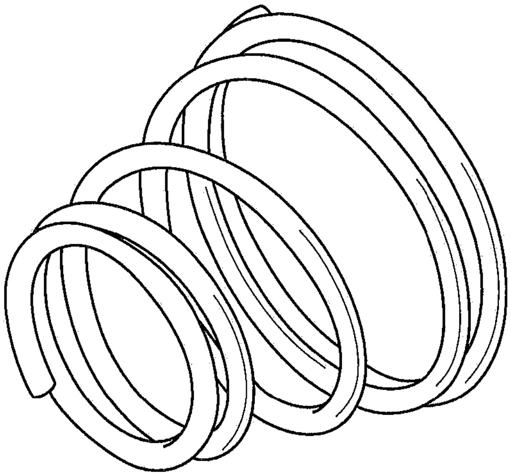
FIG. 16C Depicts the spring in trimetric view.
Figure 17A:
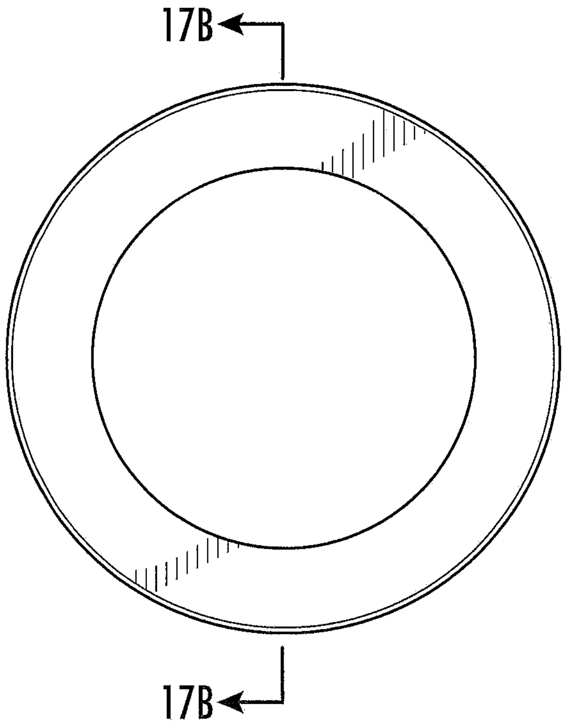
FIG. 17A Depicts the capture inset in top view.
Figure 17B:
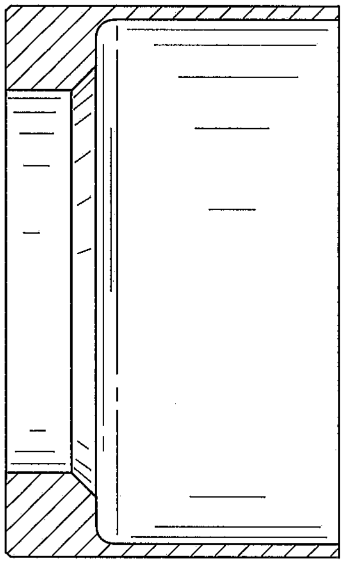
FIG. 17B Depicts the capture inset in section view. Here it can be seen that if used, the inside diameter of the capture inset serves as the shoulder that prevents the stud from exiting the housing. The top face of the capture inset presses against the wiper, holding it in place.
Figure 17C:
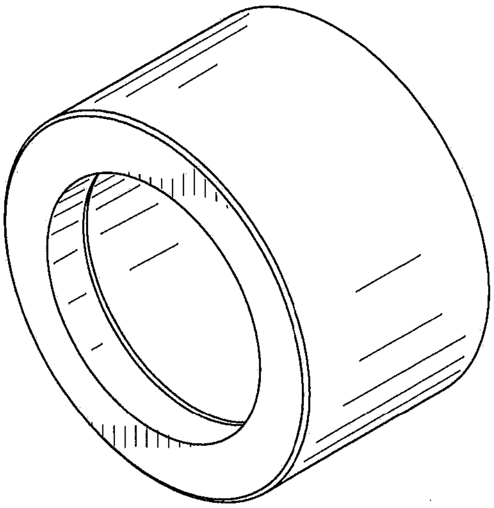
FIG. 17C Depicts the capture inset in trimetric view.
Figure 18A:
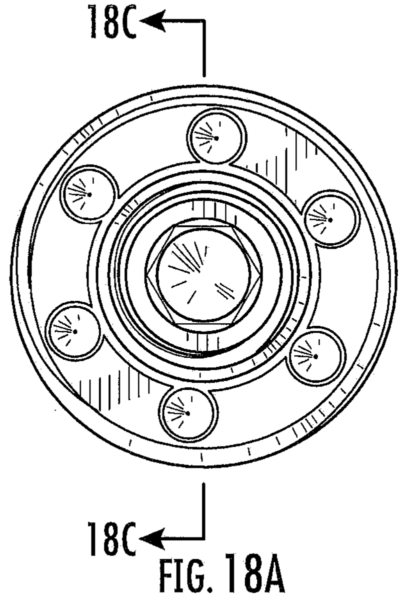
FIG. 18A Depicts the assembled fastener in top view.
Figure 18B:
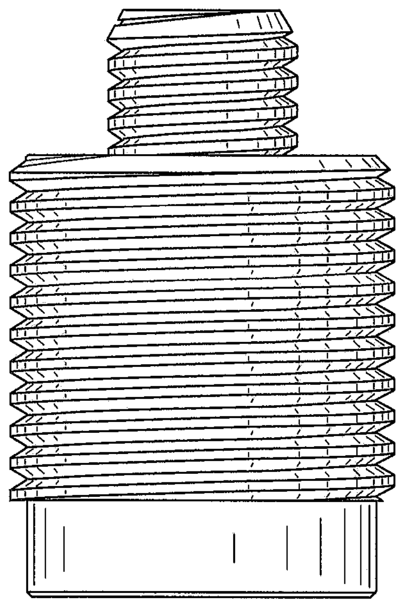
FIG. 18B Depicts the assembled fastener in side view.
Figure 18C:
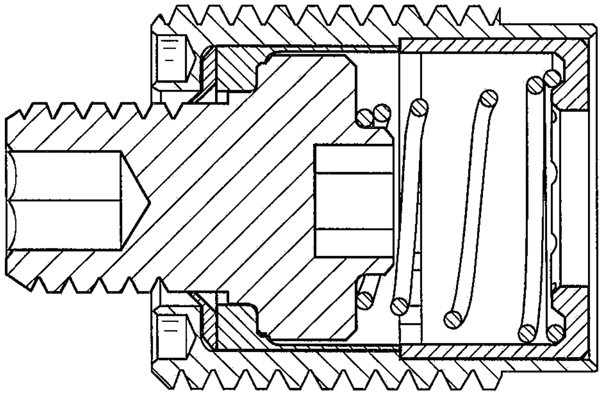
FIG. 18C Depicts the assembled fastener in section view.
Figure 18D:
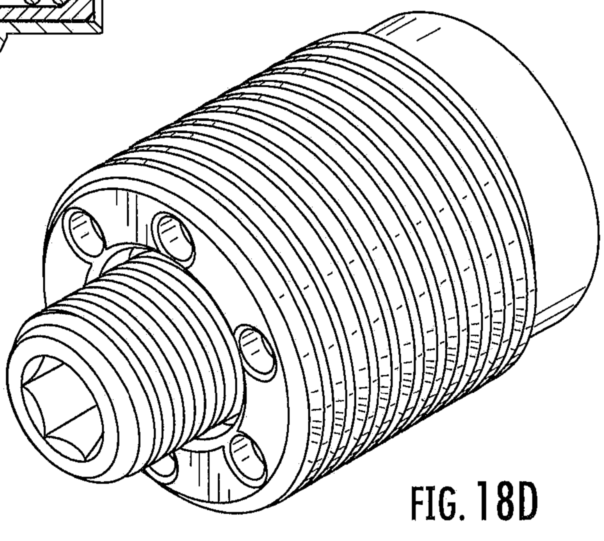
Figure 19A:
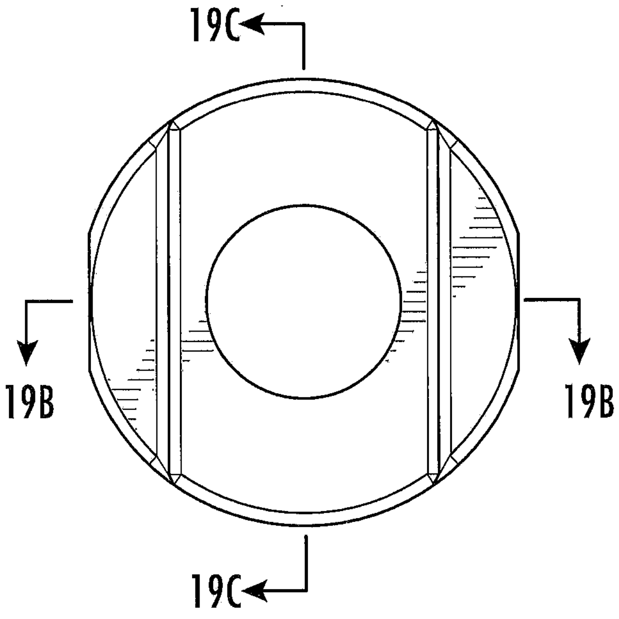
Figure 19B:
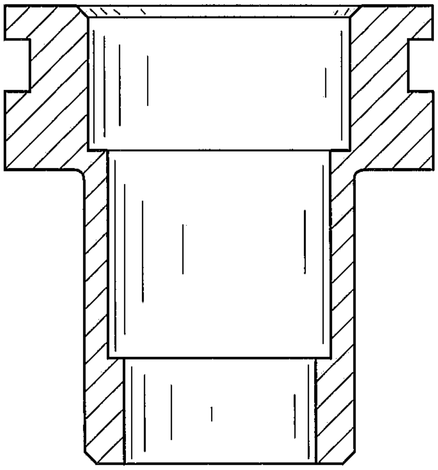
FIG. 19B Depicts the housing in section view. Here it can be observed that the housing incorporates similar internal features to the housing of FIGS. 12A-12C, in addition to a grooved slot. The housing sectional shape conforms (male to female) to the shape of the T-slot.
Figure 19C:
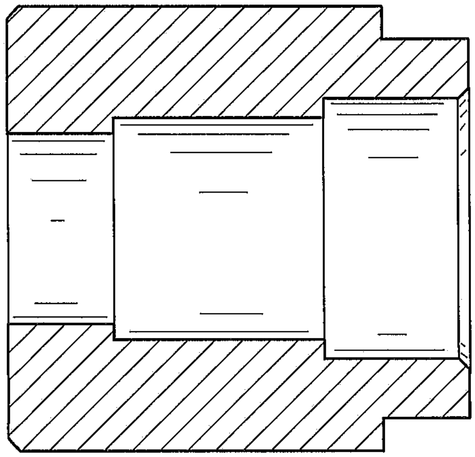
FIG. 19C Depicts the housing in section view. Here it can be observed that flats are incorporated into the housing base so as to facilitate removing the O-ring.
Figure 19D:
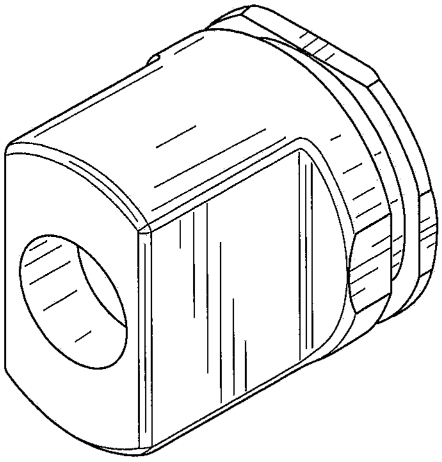
FIG. 19D Depicts the housing in trimetric view and the flats are clearly visible.
Figure 20A:
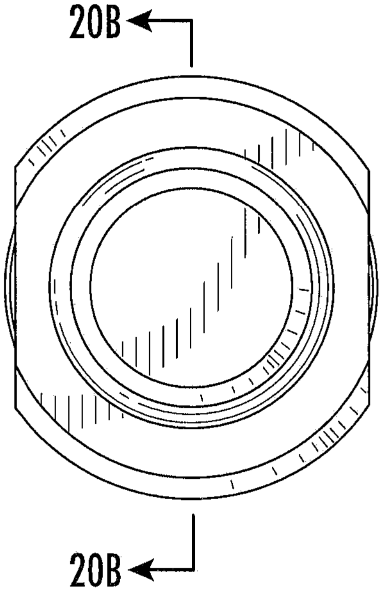
FIG. 20A Depicts the stud in top view.
Figure 20B:
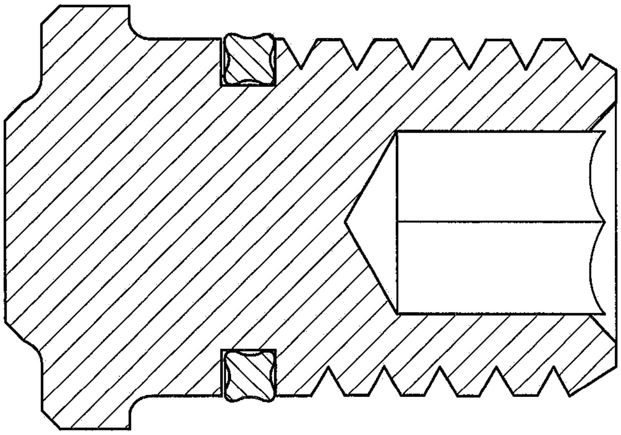
FIG. 20B Depicts the stud in section view which shows the tangs that engage/ dis-engage the release insert as well as the shoulder which is stopped by the housing shoulder. The threads are used to fasten the second object. Although the threads are the preferred embodiment, there are other methods by which the stud can engage/hold the second object. It can also be observed in this view that there is a square O-ring that is used to prevent debris from entering the housing. The shape of the O-ring and its very usage are preferred embodiments but can be optional or different.
Figure 20C:
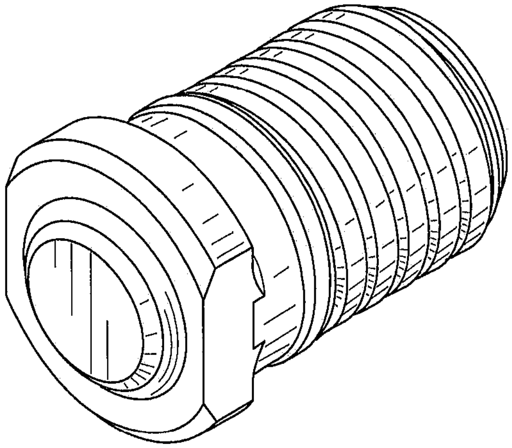
FIG. 20C Depicts the stud in trimetric view.
Figure 21A:
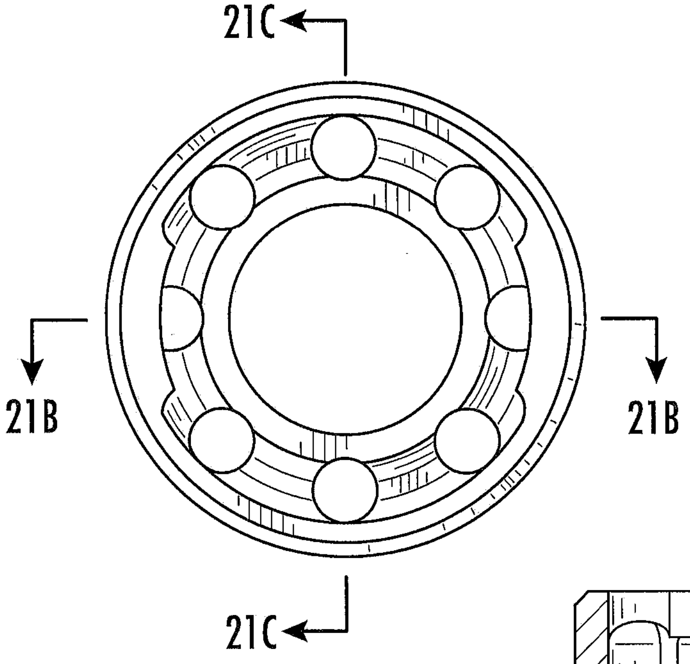
FIG. 21A Depicts the release inset in top view. In this view the tangs that engage the stud and also release the stud, based upon the stud's position, can be seen. Also, the holes in the base of the release inset can be seen. These holes facilitate the flow of liquids/debris through the fastener.
Figure 21B:
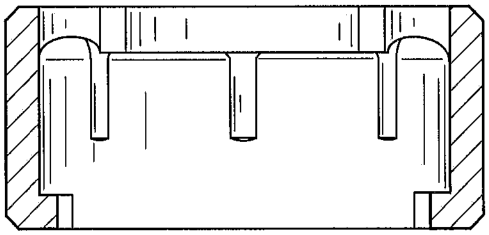
FIG. 21B Depicts the release inset in section view. Here it can be observed that there is a raised area that captures the spring. Although preferred, this raised area is not necessary to the functioning of the device.
Figure 21C:
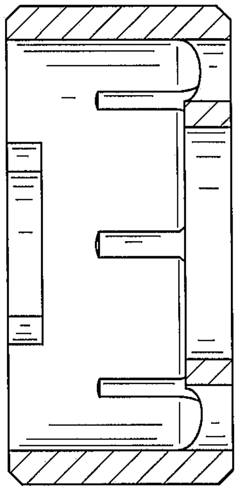
FIG. 21C Depicts the release inset in trimetric view. The walls and floor of the release inset are shown as thin in this depiction, but they can be any width that facilitates the function of the fastener.
Figure 21D:
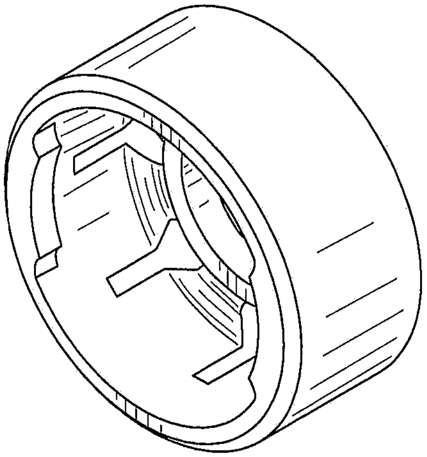
FIG. 21D Depicts the release inset in trimetric view.
Figure 22A:
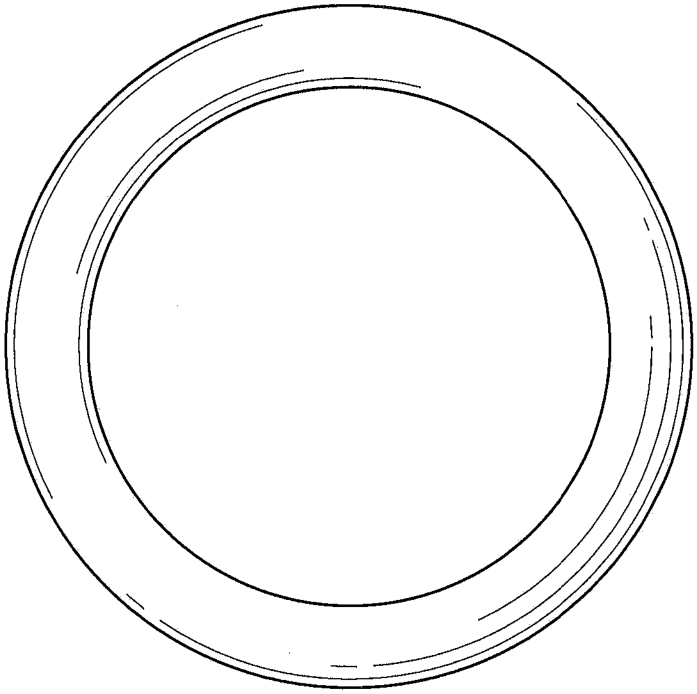
FIGS. 22A, 22B, 22C Depict the O-ring in different views. The O-ring is a preferred embodiment, used to create friction in the slot. There are specific features of the housing (flats) that are incorporated to make the O-ring optional by removal. When the O-ring is removed, the fastener slides easily in the slot, which is a desirable characteristic, at times.
Figure 22B:
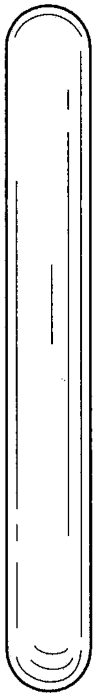
Figure 22C:
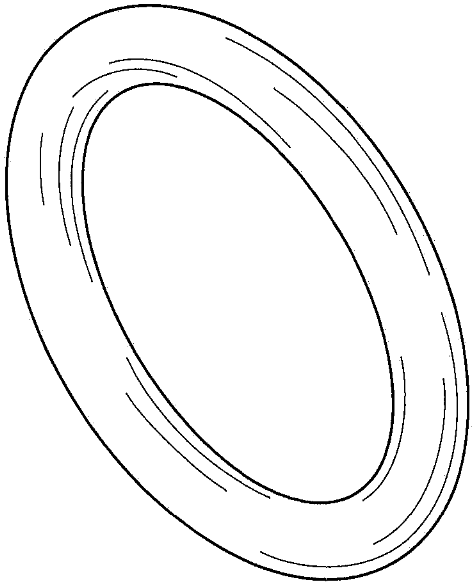
Figure 23A:
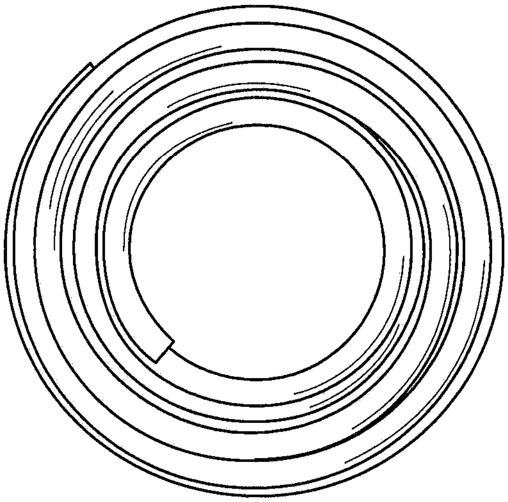
FIG. 23A Depicts the spring in top view. This spring is the preferred embodiment since it compresses to an almost flat condition, and is used to bias the stud up and out of the housing. Other spring configurations can also be used, depending upon the configuration of the release inset, housing and stud.
Figure 23B:
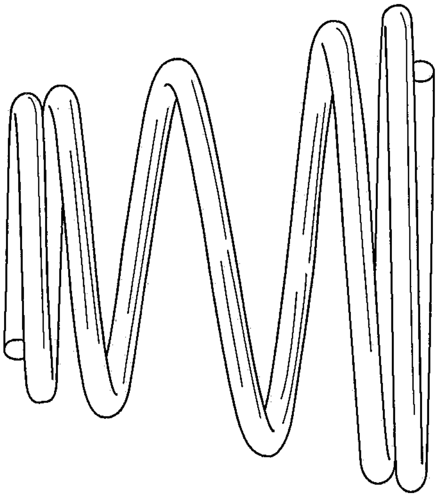
FIG. 23B Depicts the spring in side view.
Figure 23C:
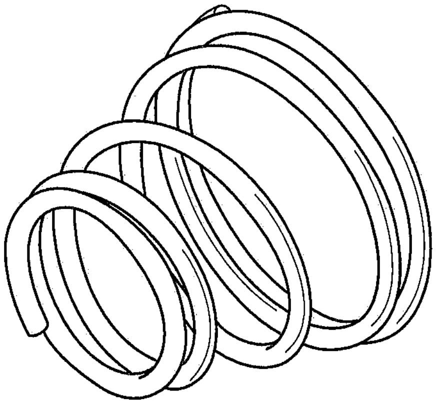
FIG. 23C Depicts the spring in trimetric view.
Figure 24A:
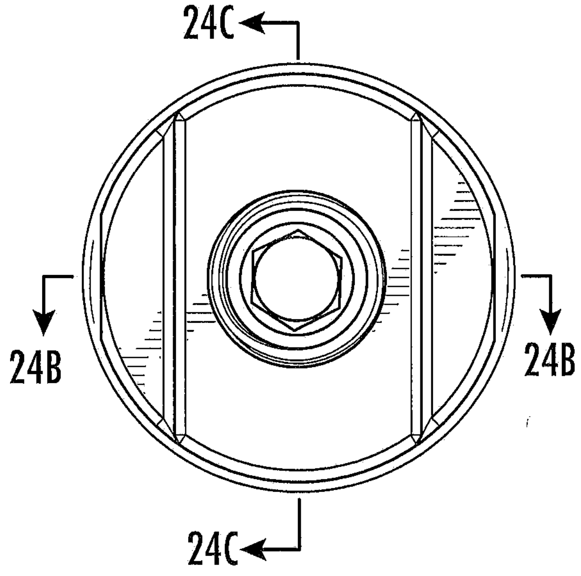
FIG. 24A Depicts the assembled fastener in top view.
Figure 24B:
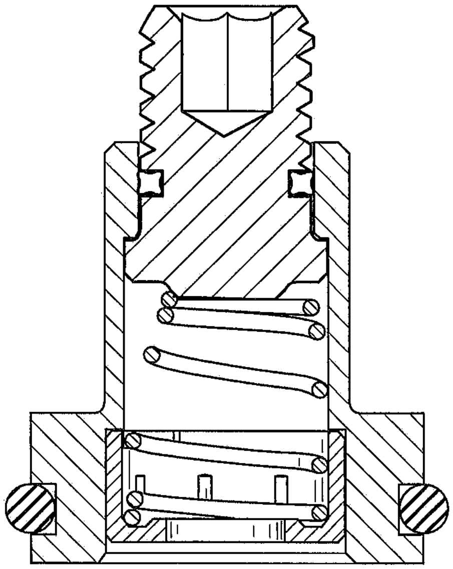
FIG. 24B Depicts the assembled fastener in section view.
Figure 24C:
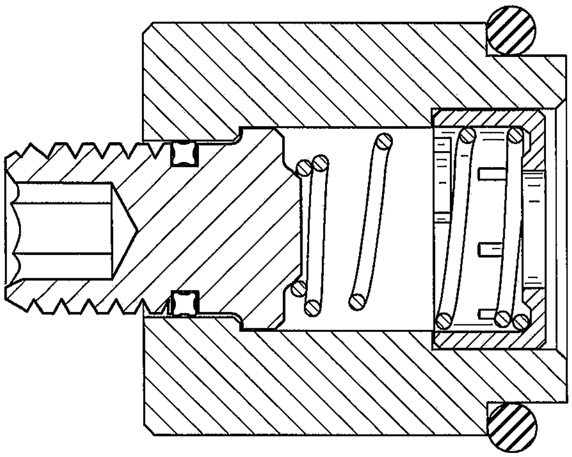
FIG. 24C Depicts the assembled fastener in section view.
Figure 24D:
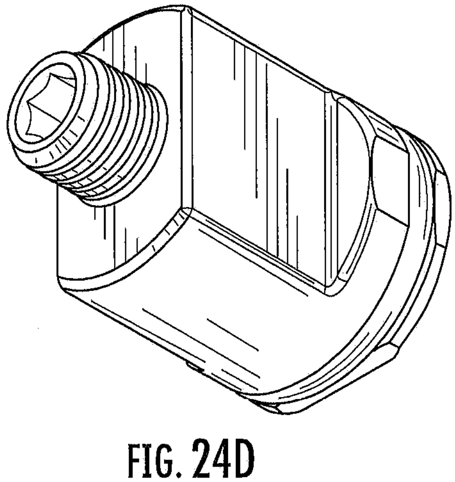
Figure 25A:
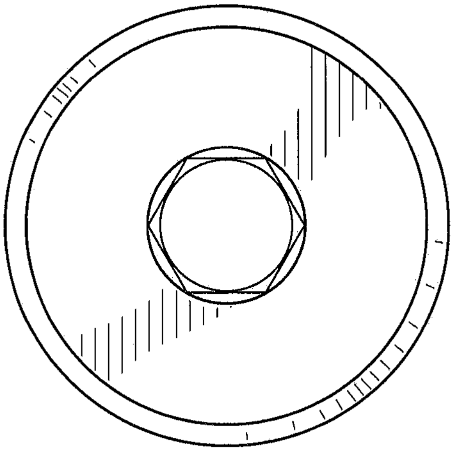
Figure 25B:
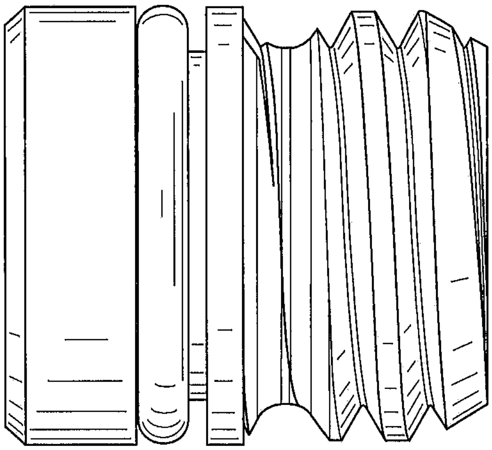
Figure 25C:
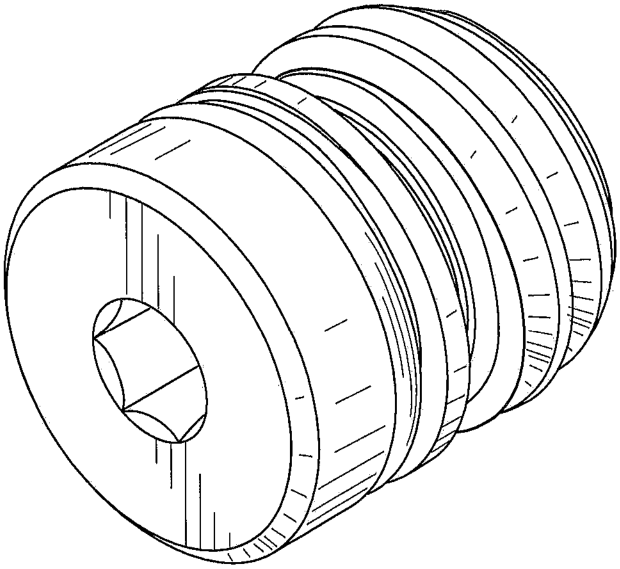
Figure 26A:
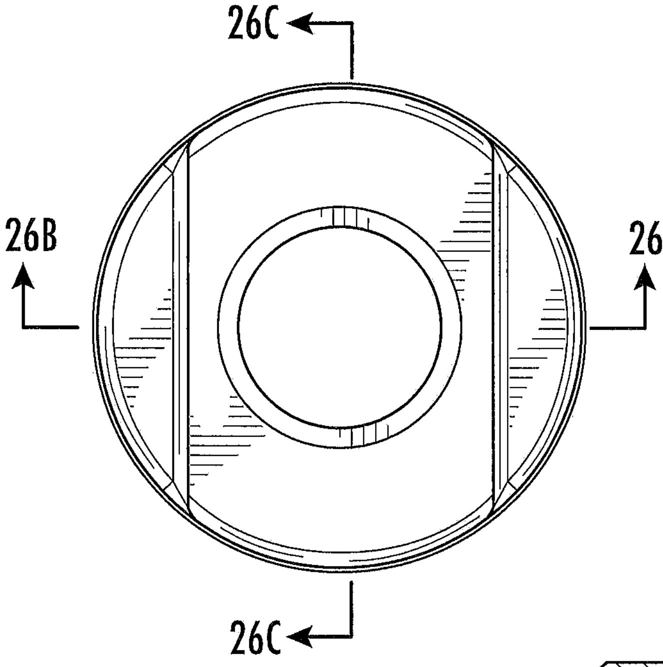
FIG. 26A Depicts the housing in top view. The preferred embodiment incorporates a circular outside diameter, but there are other shapes that may be used.
Figure 26B:
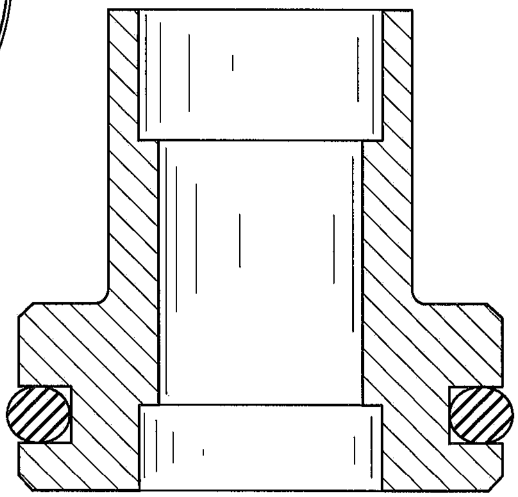
FIG. 26B Depicts the housing in section view. Here it can be observed that the housing incorporates precise counter-bores in both ends and a threaded portion between them. The counter-bores are held coincident to each other such that the location of the lower retractable dowel pin is translated to the top retractable dowel pin. The housing sectional shape conforms (male to female) to the shape of the T-slot.
Figure 26C:
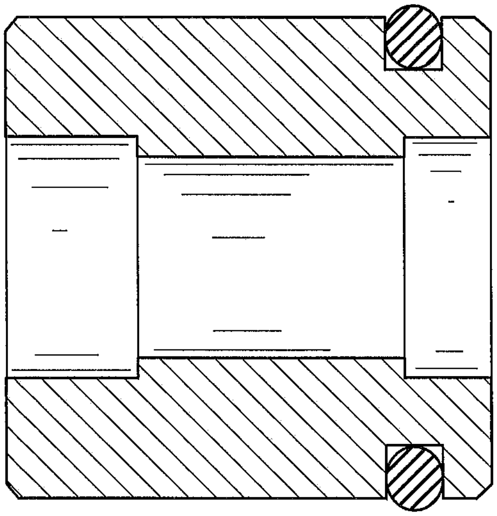
FIG. 26C Depicts the housing in section view.
Figure 26D:
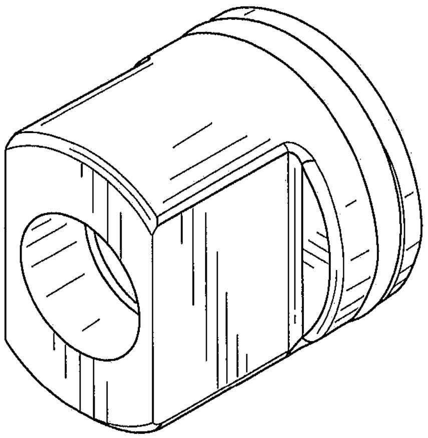
FIG. 26D Depicts the housing in trimetric view.
Figure 27A:
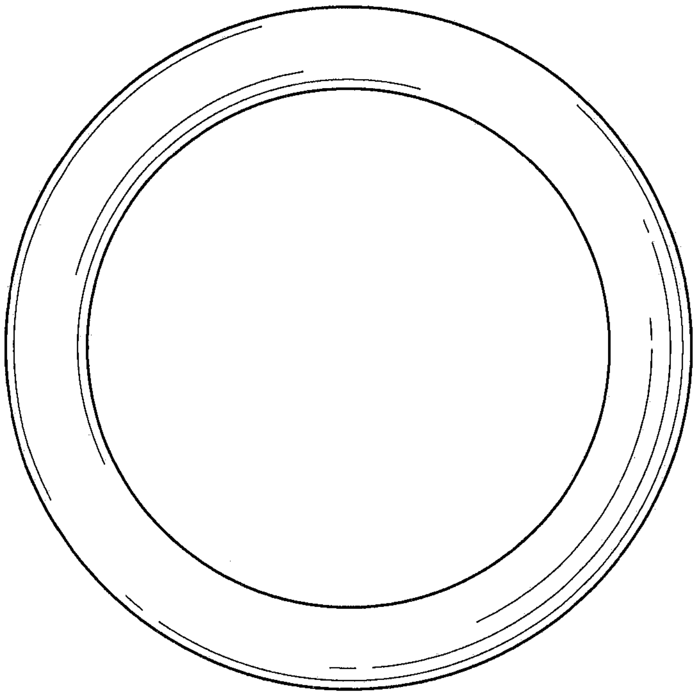
FIGS. 27A, 27B, 27C Depict the O-ring in different views. The O-ring is a preferred embodiment, used to create friction in the slot. There are specific features of the housing (flats) that are incorporated to make the O-ring optional by removal. When the O-ring is removed, the fastener slides easily in the slot, which is a desirable characteristic, at times.
Figure 27B:
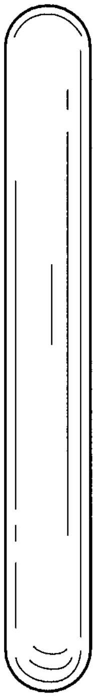
Figure 27C:
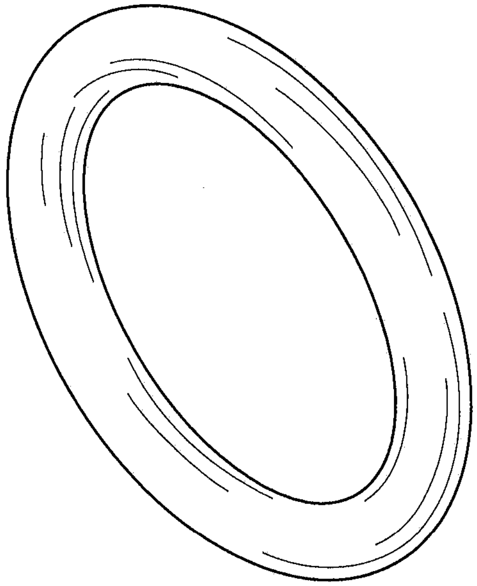
Figure 28A:
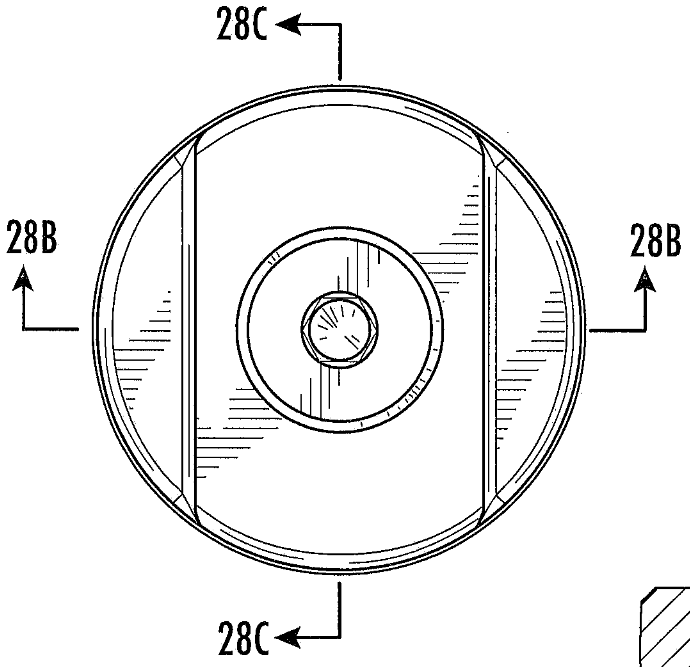
FIG. 28A Depicts the assembled T-slot locator in top view.
Figure 28B:
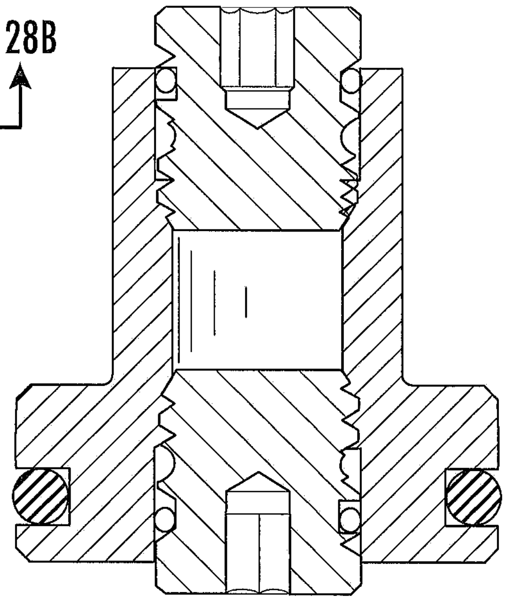
FIG. 28B Depicts the assembled T-slot locator in section view.
Figure 28C:
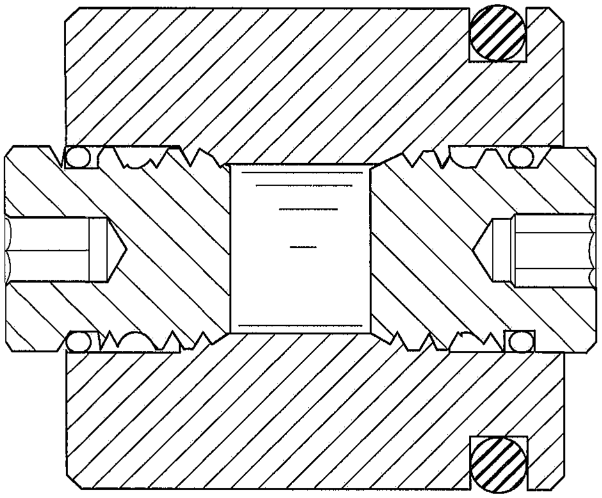
FIG. 28C Depicts the assembled T-slot locator in section view.
Figure 28D:
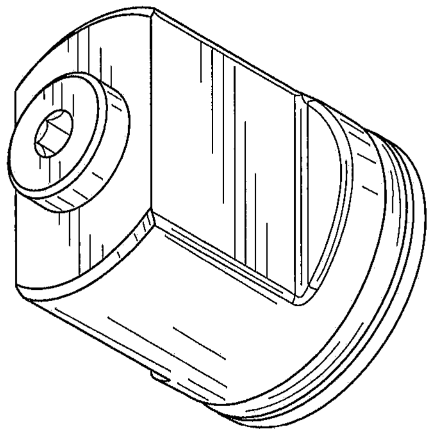
Figure 29A:
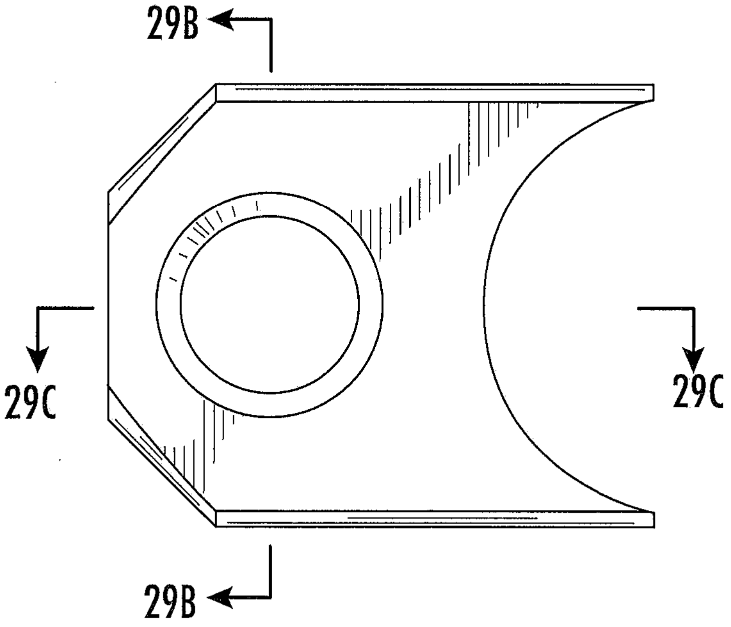
Figure 29B:
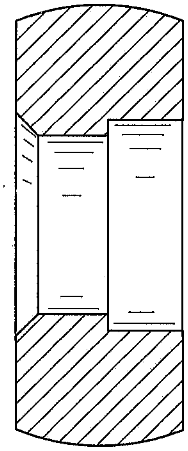
FIG. 29B Depicts the biasing member in the section view.
Figure 29C:
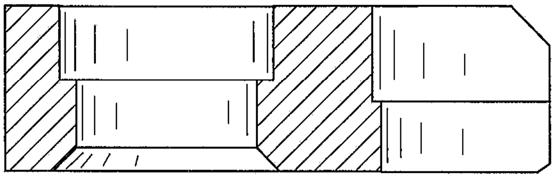
FIG. 29C Depicts the biasing member in the section view.
Figure 29D:
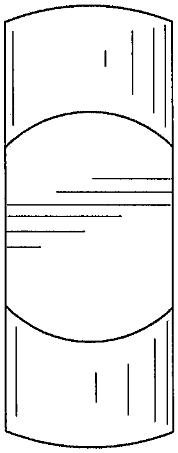
FIG. 29D Depicts the biasing member in side view.
Figure 29E:
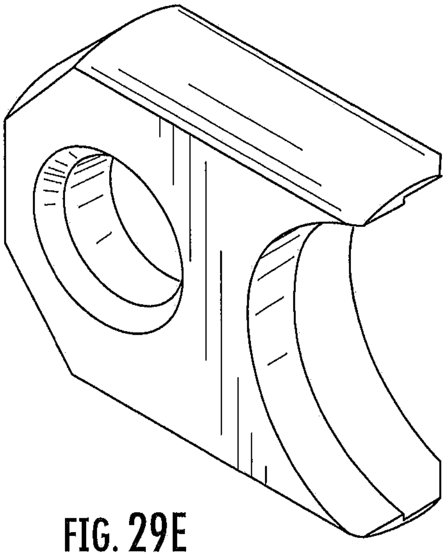
FIG. 29E Depicts the biasing member in side view.
Figure 30A:
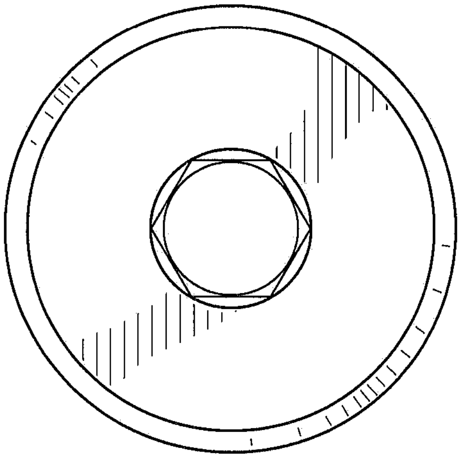
FIGS. 30A, 30B, 30C Depict the retractable dowel pin which consists of a locating shoulder; drive feature (shown as a hex but may include other features) on either end, or both; threads; and O-ring. The retractable dowel pin, when screwed into a multi-purpose hole (defined as a bored plus threaded hole) provides exact location to a secondary object.
Figure 30B:
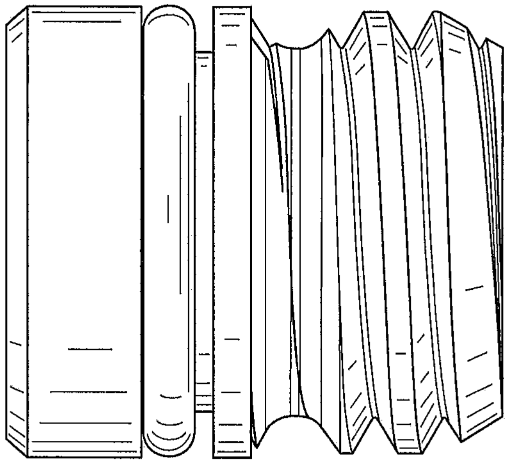
Figure 30C:
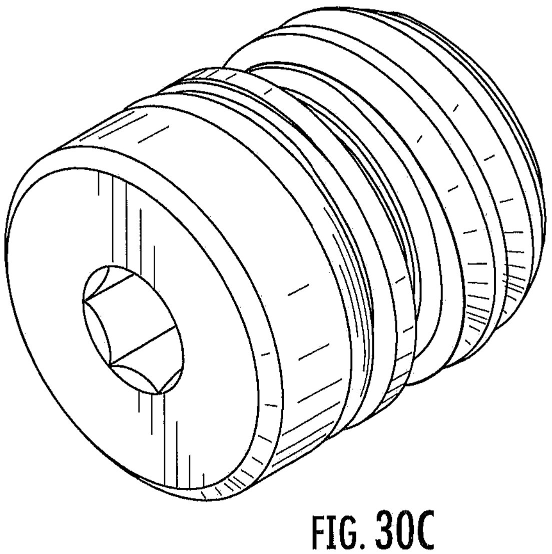

Referring now also to FIG. 11, retractable dowel pin 1100 is illustrated. Retractable dowel pin 1100 includes stud end 1102, threaded end 1104, and O-ring 1106. Stud end 1102 includes a smooth, interchangeable precision locating surface 1108. In another embodiment, the retractable dowel pin is replaced with a second retractable dowel pin to replace the smooth precision locating surface 1108 for a threaded precision locating surface. In a preferred embodiment, the retractable dowel pin is a unitary member. In another embodiment, the retractable dowel pin may have separate component parts, such as a threaded base and a spring-biased stud, where the spring-biased stud may be advanced or retracted using a rotational force, as with a quarter-turn fastener.

Referring now also to FIGS. 12A through 31D, the adjustable vise member 102, the fixed vise member 104, the fixture plate 106, a conventional base plate, a modular base plate, and combinations thereof are used with fasteners and devices as illustrated. FIGS. 12A through 31D are similar, if not identical to, FIGS. 1A-22E of U.S. Pat. Application Serial No. 15/883,991, filed 30 Jan. 2018, titled "Workholding System Using Quarter Turn Device", by Richard V. Miller, which is incorporated by reference in its entirety for all purposes.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered, modified, and/or combined, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

I claim:

1. An adjustable vise system, comprising:

an adjustable vise member, comprising:

a first housing having a lower base and an upper pusher guide, the lower base having an upper surface and a lower surface;

at least one T-slot formed in the lower surface of the lower base; and an elongated slot formed in the upper surface of the lower base, the elongated slot aligned with the T-slot to provide access to the T-slot;

at least one T-slot nut adapted as a sliding interface for the at least one T-slot, the sliding interface allowing adjustable translation relative to the T-slot; and a set screw at an end of and within the T-slot, the set screw adapted to be set to prevent the at least one T-slot nut from translating beyond an edge at the end of the T-slot;

wherein the T-slot nut comprises an interchangeable precision locating surface.

2. The adjustable vise system of claim 1, wherein the T-slot is an open-ended T-slot, providing open access to at least one of the T-slot nut and the T-slot at one side of the adjustable vise member.

3. The adjustable vise system of claim 1, wherein the T-slot is an open-ended T-slot, providing open access to at least one of the T-slot nut and the T-slot at two sides of the adjustable vise member.

4. The adjustable vise system of claim 1, the adjustable vise member further comprising:

a pusher assembly housed within the pusher guide.

5. The adjustable vise system of claim 4, wherein the pusher assembly comprises:

a pusher block having a rounded seat;

a gripper connected to the pusher block; and a keyed drive screw having a ball end and a keyed end, the ball end being seated in the rounded seat of the pusher block;

wherein the gripper comprises a first interchangeable precision locating surface; and wherein the first interchangeable precision locating surface is serrated.

6. The adjustable vise system of claim 5, wherein the pusher assembly further comprises:

a capture washer; and a slide plate;

wherein the keyed end of the keyed drive screw comprises a hex key end;

wherein the slide plate secures the hex key end of the drive screw;

wherein the capture washer secures the ball end and comprises a second interchangeable precision locating surface; and wherein the second interchangeable precision locating surface is smooth.

7. The adjustable vise system of claim 1, wherein the adjustable vise member further comprises:

a wear pad;

wherein the wear pad is removably connected to the base and comprises an interchangeable precision locating surface; and wherein the interchangeable precision locating surface is straight-lined.

8. The adjustable vise system of claim 1, wherein the lower base surface comprises a second elongated slot formed in the lower surface of the lower base; and wherein the second elongated slot has:

central alignment relative to the adjustable vise member;

a first discrete depth allowing adjustable translation relative to a retractable dowel pin; and a second discrete depth for securely receiving a precision locating surface of the retractable dowel pin.

9. The adjustable vise system of claim 1, wherein the first housing is a unitary member having the upper pusher guide integrally formed with the lower base.

10. The adjustable vise system of claim 1, further comprising:

a fixed vise member, comprising:

a second housing having a lower base and an upper abutment block, the lower base of the second housing having an upper surface and a lower surface;

at least a second T-slot formed in the lower surface of the base of the second housing; and at least a second elongated slot formed in the upper surface of the base of the second housing, the second elongated slot aligned with the second T-slot to provide access to the second T-slot.

11. The adjustable vise system of claim 10, further comprising:

at least a second T-slot nut adapted as a sliding interface for the second T-slot, the sliding interface allowing adjustable translation relative to the second T-slot;

wherein the T-slot nut comprises an interchangeable precision locating surface.

12. The adjustable vise system of claim 11, wherein the second T-slot is an open-ended T-slot, providing open access to at least one of the second T-slot nut and the second T-slot at one side of the fixed vise member.

13. The adjustable vise system of claim 11, wherein the second T-slot is an open-ended T-slot, providing open access to at least one of the second T-slot nut and the second T-slot at two sides of the fixed vise member.

14. The adjustable vise system of claim 10, the fixed vise member further comprising:

a second set screw at an end of the second T-slot, the second set screw adapted to be set to prevent the second T-slot nut from translating beyond an edge at the end of the second T-slot.

15. The adjustable vise system of claim 10, wherein the fixed vise member further comprises:

a wear pad;

wherein the wear pad is removably connected to the base and comprises an interchangeable precision locating surface; and wherein the interchangeable precision locating surface is straight-lined.

16. The adjustable vise system of claim 10, wherein the base of the second housing further comprises:

an opening for a stop pin;

wherein the stop pin comprises an interchangeable precision locating surface.

17. The adjustable vise system of claim 10, wherein the lower base surface of the second housing comprises at least a third elongated slot formed in the lower surface of the lower base of the second housing; and wherein the third elongated slot has:

central alignment relative to the fixed vise member;

a first discrete depth allowing adjustable translation relative to a retractable dowel pin; and a second discrete depth for securely receiving a precision locating surface of the retractable dowel pin;

wherein the precision locating surface of the retractable dowel pin is rounded.

18. The adjustable vise system of claim 10, wherein the second housing is a unitary member having the upper abutment block integrally formed with the lower base.

19. The adjustable vise system of claim 1, further comprising:

a fixture plate, comprising:

a third housing having a lower base and an upper locating portion, the lower base of the third housing having an upper surface and a lower surface;

at least a third T-slot formed or attached on the upper surface of the base of the third housing; and at least a third elongated slot formed in the upper surface of the base of the third housing, the third elongated slot parallel with the third T-slot.

20. The adjustable vise system of claim 19, wherein the fixture plate further comprises:

at least a fourth elongated slot formed in the upper locating portion of the third housing;

wherein the fourth elongated slot has:

central alignment relative to a T-slot member;

a first discrete depth allowing adjustable translation relative to a retractable dowel pin; and a second discrete depth for securely receiving a precision locating surface of the retractable dowel pin;

wherein the precision locating surface of the retractable dowel pin is rounded.

21. The adjustable vise system of claim 19, further comprising:

at least a second T-slot nut adapted as a sliding interface for the third T-slot, the sliding interface allowing adjustable translation relative to the third T-slot;

wherein the T-slot nut comprises an interchangeable precision locating surface.

22. The adjustable vise system of claim 21, wherein the third T-slot is an open-ended T-slot, providing open access to at least one of the second T-slot nut and the third T-slot at two sides of the fixture plate.

23. The adjustable vise system of claim 19, wherein the third housing is a unitary member having the upper locating portion integrally formed with the lower base.

* * * * *